(12) United States Patent
Nagata et al.

(10) Patent No.: US 9,781,584 B2
(45) Date of Patent: Oct. 3, 2017

(54) DISTANCE ESTIMATION METHOD, TRANSMISSION POWER CONTROL METHOD, USER APPARATUS, AND BASE STATION

(71) Applicant: NTT DOCOMO, INC., Tokyo (JP)

(72) Inventors: Satoshi Nagata, Tokyo (JP); Qun Zhao, Beijing (CN); Yongbo Zeng, Beijing (CN); Yongsheng Zhang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 60 days.

(21) Appl. No.: 14/761,756

(22) PCT Filed: Feb. 4, 2014

(86) PCT No.: PCT/JP2014/052525
§ 371 (c)(1),
(2) Date: Jul. 17, 2015

(87) PCT Pub. No.: WO2014/123103
PCT Pub. Date: Aug. 14, 2014

(65) Prior Publication Data
US 2015/0358802 A1 Dec. 10, 2015

(30) Foreign Application Priority Data
Feb. 8, 2013 (JP) .................................. 2013-023393

(51) Int. Cl.
*H04W 8/00* (2009.01)
*H04W 52/02* (2009.01)
(Continued)

(52) U.S. Cl.
CPC ............. *H04W 8/005* (2013.01); *G01S 11/06* (2013.01); *H04W 8/00* (2013.01); *H04W 24/02* (2013.01);
(Continued)

(58) Field of Classification Search
CPC ....... H04W 8/005; H04W 8/00; H04W 64/00; H04W 24/02; H04W 52/0261;
(Continued)

(56) References Cited

U.S. PATENT DOCUMENTS 5,931,916 A 8/1999 Barker et al.
8,275,407 B2 9/2012 Laroia et al.
(Continued)

FOREIGN PATENT DOCUMENTS

CN 102077622 A 5/2011
CN 102132171 A 7/2011
(Continued)

OTHER PUBLICATIONS

Office Action dated Oct. 27, 2016 in corresponding Chinese Patent Application No. 201480006761.6 (with translation) (20 pages).
(Continued)

*Primary Examiner* — Brian D Nguyen
(74) *Attorney, Agent, or Firm* — Osha Liang LLP

(57) ABSTRACT

A distance estimation method for, by causing a first user apparatus to receive a discovery signal from a second user apparatus, estimating a distance between the first user apparatus and the second user apparatus is provided. The distance estimation method includes a step of receiving from the second user apparatus the discovery signal including transmission power information of the discovery signal, a step of obtaining the transmission power information from the discovery signal, and a step of estimating the distance between the first user apparatus and the second user apparatus from receive power information of the discovery signal at the first user apparatus and the transmission power information.

10 Claims, 20 Drawing Sheets

(51) Int. Cl.
*H04W 24/02* (2009.01)
*H04W 64/00* (2009.01)
*G01S 11/06* (2006.01)
*H04W 88/04* (2009.01)
*H04W 88/08* (2009.01)

(52) U.S. Cl.
CPC ....... *H04W 52/0261* (2013.01); *H04W 64/00* (2013.01); *H04W 88/04* (2013.01); *H04W 88/08* (2013.01); *Y02B 60/50* (2013.01)

(58) Field of Classification Search
CPC ....... H04W 88/04; H04W 88/08; G01S 11/06; Y02B 60/50
See application file for complete search history.

(56) References Cited

U.S. PATENT DOCUMENTS

| | | | |
|---|---|---|---|
| 8,369,800 | B2 | 2/2013 | Li et al. |
| 8,452,317 | B2 | 5/2013 | Li et al. |
| 8,634,869 | B2 | 1/2014 | Li et al. |
| 8,929,281 | B2 | 1/2015 | Li et al. |
| 2008/0003978 | A1* | 1/2008 | Sengupta ............. H04W 60/00 455/410 |
| 2009/0323648 | A1 | 12/2009 | Park et al. |
| 2010/0052989 | A1 | 3/2010 | Canoy |
| 2011/0087768 | A1 | 4/2011 | Wu et al. |
| 2011/0205887 | A1 | 8/2011 | Wu et al. |
| 2011/0211560 | A1 | 9/2011 | Yamamoto et al. |
| 2012/0213109 | A1* | 8/2012 | Xu ......................... H04B 7/024 370/252 |
| 2012/0249372 | A1* | 10/2012 | Jovicic ................... G01S 1/042 342/451 |
| 2012/0295654 | A1* | 11/2012 | Sridhara .............. G01S 5/0226 455/517 |
| 2013/0250931 | A1* | 9/2013 | Abraham .............. H04W 8/005 370/338 |
| 2013/0303223 | A1* | 11/2013 | Patil ...................... H04W 8/005 455/517 |

FOREIGN PATENT DOCUMENTS

| | | |
|---|---|---|
| CN | 102577495 A | 7/2012 |
| CN | 102771167 A | 11/2012 |
| JP | 2004-328542 A | 11/2004 |
| JP | 2009236781 A | 10/2009 |
| JP | 2011182009 A | 9/2011 |
| JP | 2011-526475 A | 10/2011 |
| JP | 2012-501449 A | 1/2012 |
| WO | 2008/034029 A2 | 3/2008 |
| WO | 2011/046962 A1 | 4/2011 |
| WO | 2011/106699 A1 | 9/2011 |
| WO | 2011/130623 A2 | 10/2011 |

OTHER PUBLICATIONS

International Search Report issued in PCT/JP2014/052525 dated Apr. 15, 2014 (3 pages).
Written Opinion of the International Searching Authority issued in PCT/JP2014/052525 dated Apr. 15, 2014 (5 pages).
Office Action issued in the counterpart Chinese Patent Application No.: 201480006761.6, mailed Jun. 5, 2017 (14 pages).
Office Action issued in the counterpart Japanese Patent Application No.: 2013-023393, mailed Jun. 20, 2017 (6 pages).

* cited by examiner

FIG.4

| | TRANSMISSION POWER | DISTANCE TO UE-C | RECEIVE POWER AT UE-C |
|---|---|---|---|
| RESTAURANT A | 23dBm | 200m | −59.4dBm |
| RESTAURANT B | 15dBm | 150m | −62.4dBm |

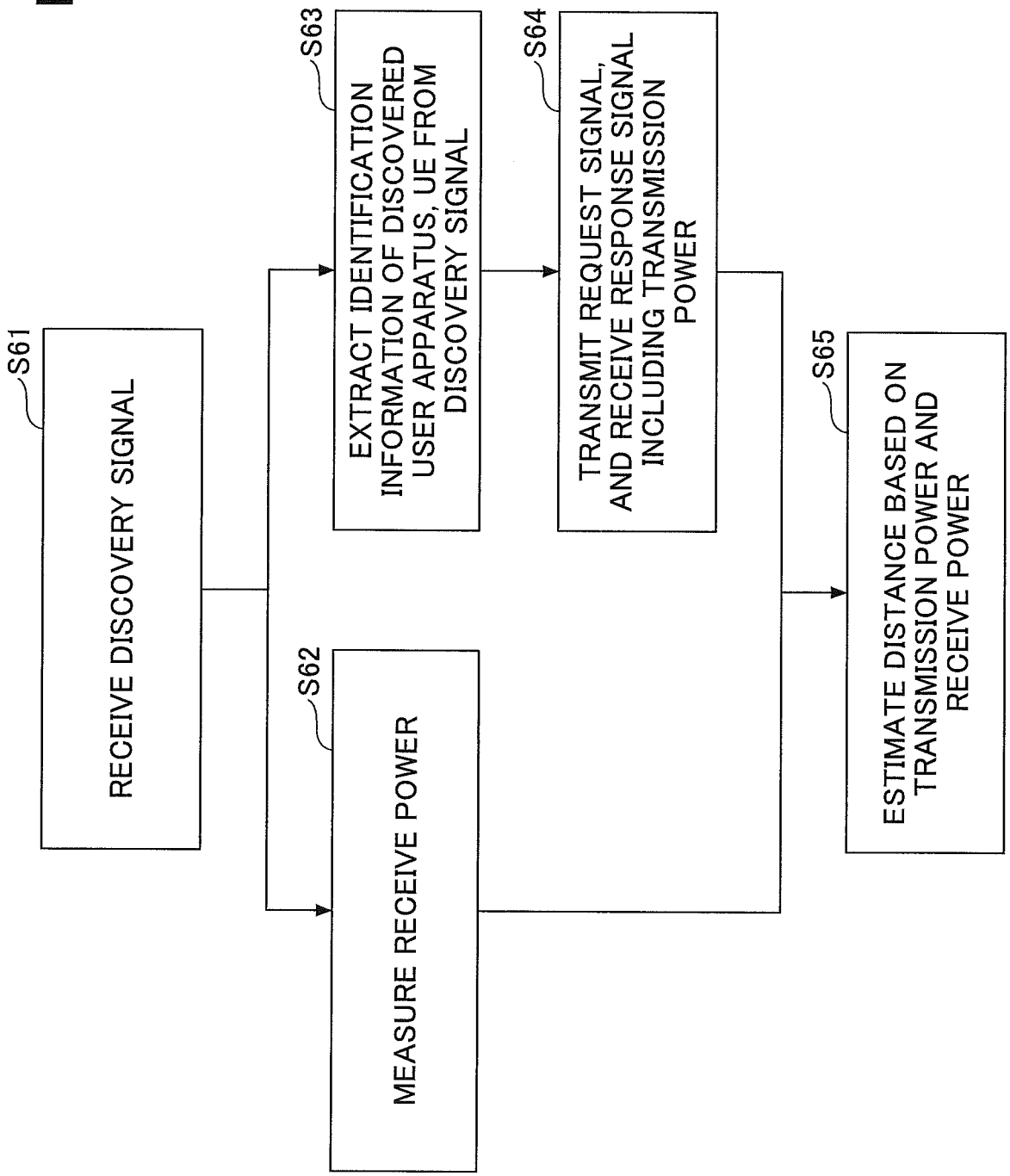

DISTANCE ESTIMATION METHOD, TRANSMISSION POWER CONTROL METHOD, USER APPARATUS, AND BASE STATION

TECHNICAL FIELD

The present invention relates to terminal-to-terminal communications, in particular, relates to a technology in which a terminal discovers another terminal in the terminal-to-terminal communications.

BACKGROUND ART

While it is common that, by having communications between a terminal (hereinafter refer to user apparatus UE) and a base station BS, the communication between user apparatuses UEs is performed in mobile communications, recently, various technologies have been studied on direct communications between the user apparatuses UEs.

It is necessary for a user apparatus UE to discover another nearby user apparatus UE when communications between the user apparatuses UEs are performed. The present application relates to the discovery of the user apparatus UE in the communications between the user apparatuses UEs.

As one of the methods for discovering a user apparatus UE, there is a method in which each user apparatus UE transmits (broadcasts) a discovery signal which includes its own identification information. For example, as shown in FIG. 1, in the case where a user apparatus UE-A transmits a discovery signal including its identification information and the discovery signal is received by a user apparatus UE-B, the UE-B discovers the user apparatus UE-A by determining that the discovery signal includes the identification information of the user apparatus UE-A. It should be noted that, as an example, the user apparatus UE-B, which has discovered the user apparatus UE-A, transmits a notice directly or via a base station BS to the user apparatus UE-A, indicating that the UE-B has discovered the UE-A, and communicates with the user apparatus UE-A.

Here, a distance from the user apparatus UE, within which another user apparatus UE can discover the user apparatus UE, depends on transmission power with which the user apparatus UE transmits the discovery signal.

FIG. 2 shows a situation in which the user apparatus UE-A transmits the discovery signal and user apparatuses UE-B through UE-D discover the user apparatus UE-A. As shown in FIG. 2, in the case where the transmission power of the user apparatus UE-A is low, the user apparatus UE-A is discovered by the UE-B only which is within a short distance from the UE-A. In the case where the transmission power of the user apparatus UE-A is medium, the user apparatus UE-A is discovered by the user apparatuses UE-B and UE-C. In the case where the transmission power of the user apparatus UE-A is high, the user apparatus UE-A is discovered by the user apparatuses UE-B, UE-C, and UE-D.

Although, as described above, the distance within which another user apparatus UE can discover the user apparatus UE can be determined according to the transmission power of the discovery signal transmitted by the user apparatus UE, the transmission power of the discovery signal transmitted by the user apparatus UE is not constant and varies depending on various cases shown below. It should be noted that the cases shown below are just examples.

EXAMPLE 1

Variation Depending on Battery States

While a user apparatus UE with sufficient remaining battery energy transmits the discovery signal with higher transmission power, a user apparatus UE with little remaining battery energy transmits the discovery signal with lower transmission power in order to save energy.

EXAMPLE 2

Variation Depending on Environment

In an environment such as in a park or in a local area where user apparatuses UEs exist sparsely, the user apparatuses UEs transmit a discovery signal with high transmission power in order to discover user apparatuses UEs residing a long distance away from each other. In an environment where user apparatuses UEs exist densely (e.g., indoor, in a station), the user apparatuses UEs transmit a discovery signal with low transmission power because of the limited space.

EXAMPLE 3

Variation Depending on Services

It is possible that different discovery criteria are set for different services. For example, in an advertisement service, it is assumed that the advertising shops, etc., transmit a discovery signal with high transmission power in order to allow user apparatuses UEs in a wider area to discover the discovery signal. On the other hand, for example, in a local print service, etc., a printer, which is a user apparatus UE, transmits a discovery signal with low transmission power in order to allow user apparatuses UEs which exist in a limited space (e.g., in the same room) to discover the printer.

EXAMPLE 4

Variation Depending on Transmission Power Control

Because the user apparatus UE receives transmission power control for reducing interference, the transmission power of a discovery signal is changed according to the transmission power control. For example, the transmission power is decreased when interference is high and the transmission power is increased when interference is low.

It should be noted that, regarding the prior art, for example, there are technologies described in patent documents 1 through 4.

RELATED ART DOCUMENT

[PATENT DOCUMENT 1] U.S. Pat. No. 8,275,407
[PATENT DOCUMENT 2] US2011/0205887
[PATENT DOCUMENT 3] WO2008/034029
[PATENT DOCUMENT 4] U.S. Pat. No. 5,931,916

SUMMARY OF THE INVENTION

Problem to be Solved by the Invention

In the discovery of a user apparatus UE, it is desired that the distance between the discovering user apparatus UE and the discovered user apparatus UE is found. For example, in the case where a user apparatus UE wants to find a restaurant within 100 m, it is necessary not only to find the restaurant by receiving a discovery signal transmitted by the restaurant (the user apparatus thereof), but also to find the distance between the user apparatus UE and the restaurant.

The user apparatus UE may estimate the distance to the user apparatus UE which has transmitted the discovery signal from the receive power of the received discovery signal. For example, high receive power suggests a short distance.

However, it is difficult to estimate a distance to the discovered user apparatus UE from the receive power alone because, as described above, it is possible that the user apparatus UE may transmit the discovery signal with various transmission power levels.

For example, as shown in FIG. 3, the user apparatus UE-C discovers both the user apparatus UE-A (restaurant A) and UE-B (restaurant B). However, as shown in FIG. 4, the user apparatus UE-A transmits a discovery signal with high transmission power, the user apparatus UE-B transmits a discovery signal with low transmission power, and the receive power received from the user apparatus UE-A is higher than the receive power received from the user apparatus UE-B in spite of the fact that the user apparatus UE-A is located further from the user apparatus UE-C than the user apparatus UE-B. In other words, in the case where the receive power alone is used, it will be estimated that the user apparatus UE-A is closer. This estimation is wrong in an example of FIG. 3.

The present invention has been made in view of the above points, and whose objective is, in a technology for a user apparatus, to discover another user apparatus based on a discovery signal transmitted by the other user apparatus, and to provide a technique for estimating a distance to the other user apparatus.

Means for Solving the Problem

In order to solve the problem described above, according to the embodiment of the present invention, a distance estimation method is provided for estimating a distance between a first user apparatus and a second user apparatus by receiving, by the first user apparatus, a discovery signal from the second user apparatus. The distance estimation method includes:

a step of receiving from the second user apparatus the discovery signal including transmission power information of the discovery signal;

a step of obtaining the transmission power information from the discovery signal; and a step of estimating a distance between the first user apparatus and the second user apparatus based on receive power information of the discovery signal at the first user apparatus and the transmission power information.

Also, according to the embodiment of the present invention, in a mobile communications system including a user apparatus and a base station, a distance estimation method is provided for estimating a distance between a first user apparatus and a second user apparatus by receiving, by the first user apparatus, a discovery signal from the second user apparatus. The distance estimation method includes:

a step of receiving from the base station a power class corresponding to transmission power information of the discovery signal;

a step of receiving from the second user apparatus the discovery signal;

a step of estimating the transmission power information of the discovery signal received by the second user apparatus based on the power class; and a step of estimating a distance between the first user apparatus and the second user apparatus based on receive power information of the discovery signal received at the first user apparatus and the transmission power information estimated in the estimation step.

Also, according to the embodiment of the present invention, in a mobile communications system including a user apparatus and a base station, a distance estimation method is provided for estimating a distance between a first user apparatus and a second user apparatus by receiving, by the first user apparatus, a discovery signal from the second user apparatus. The distance estimation method includes:

a transmission power obtaining step of receiving an uplink signal transmitted from the second user apparatus to the base station and obtaining transmission power information of the discovery signal at the second user apparatus based on the uplink signal;

a step of receiving the discovery signal from the second user apparatus; and a step of estimating a distance between the first user apparatus and the second user apparatus based on receive power information of the discovery signal received at the first user apparatus and the transmission power information obtained in the transmission power obtaining step.

Also, according to the embodiment of the present invention, in a mobile communications system including a user apparatus and a base station, a distance estimation method is provided for estimating a distance between a first user apparatus and a second user apparatus by receiving, by the first user apparatus, a discovery signal from the second user apparatus. The distance estimation method includes:

a transmission power obtaining step of transmitting to the base station a request signal requesting for transmission power information of the discovery signal of the second user apparatus and receiving from the base station a response signal including the transmission power information; and a step of estimating a distance between the first user apparatus and the second user apparatus based on receive power information of the discovery signal received from the second user apparatus and the transmission power information obtained in the transmission power obtaining step.

Also, according to the embodiment of the present invention, in a mobile communications system including a user apparatus and a base station, there is a transmission power control method for the base station to control transmission power of a discovery signal of the user apparatus. The transmission power control method includes:

a user apparatus number estimation step of estimating a number of user apparatuses transmitting discovery signals by monitoring the discovery signals transmitted by the user apparatuses;

a power class determination step of, by referring to power class setting information which associates a number of user apparatuses transmitting discovery signals with a power class used for determining transmission power information of the discovery signal at the user apparatus, determining the power class associated with the number of user apparatuses estimated in the user apparatus number estimation step; and a step of transmitting to the user apparatuses the power class determined in the power class determination step.

Also, according to the embodiment of the present invention, a user apparatus and a base station suitable for implementing the methods described above are provided.

Effect of the Present Invention

According to the embodiment of the present invention, in a technology for a user apparatus to discover another user apparatus based on the discovery signal transmitted by the other user apparatus, it becomes possible to estimate a distance to the other user apparatus.

BRIEF DESCRIPTION OF THE DRAWINGS

FIG. 4 is a drawing illustrating the problem.

FIG. 20 is a flowchart illustrating operations of the user apparatus UE in the fourth embodiment.

EMBODIMENTS FOR CARRYING OUT THE INVENTION

Figure 1:
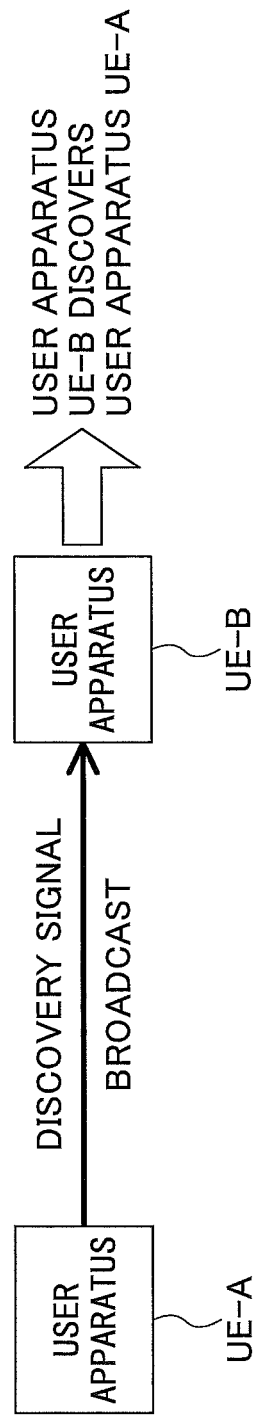
FIG. 1 is a drawing illustrating a technology for discovering a user apparatus UE in terminal-to-terminal communications.
Figure 2:
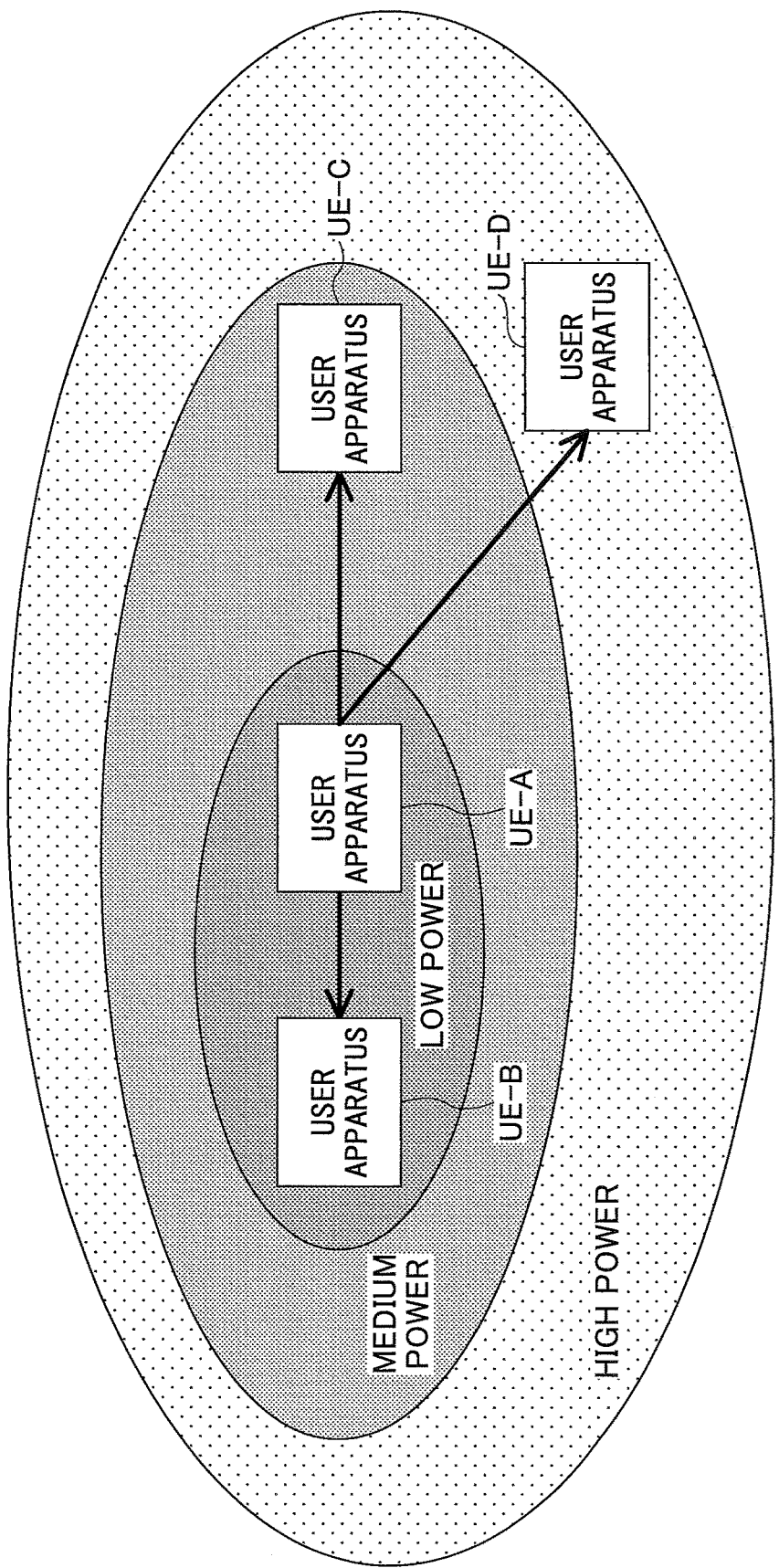
FIG. 2 is a drawing illustrating a situation in which the user apparatus UE-A transmits the discovery signal and the user apparatuses UE-B through UE-D discover the user apparatus UE-A.
Figure 3:
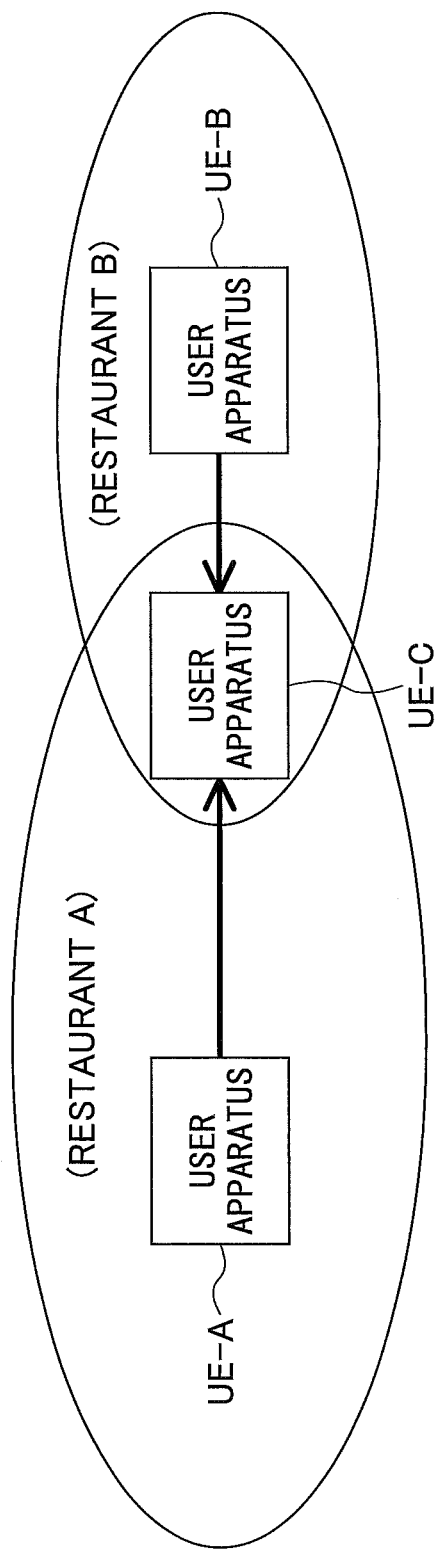
FIG. 3 is a drawing illustrating the problem.

In the following, referring to the drawings, embodiments of the present invention will be described. It should be noted that the embodiments described below are merely examples and the embodiments which the present invention is applied to are not limited to the following embodiments.

(First Embodiment)

First, a first embodiment of the present invention will be described.

<Process Content>

In the first embodiment, each user apparatus UE transmits a discovery signal in which its identification information is included in addition to an indicator indicating its transmission power. Here, an indicator related to the transmission power and/or an indicator related to transmission antenna gain may be included in the indicator indicating the transmission power. Also, information such as the transmission power or the transmission antenna gain, which can be used for distance estimation at a receive side of a signal, may be referred to as transmission power information. In other words, the user apparatus UE, which has received the discovery signal, estimates the distance by using the transmission power information and reception power information.

In the present embodiment, the transmission power is quantized as the indicator described above, and the indicator is included in the discovery signal. For example, the transmission power is quantized into three classes (which can be expressed by two bits). More specifically, for example, the transmission power is classified into three classes including H (high), M (medium) and L (low), where H is expressed by 11, M is expressed by 10, and L is expressed by 01. Also, in the user apparatus UE transmitting the discovery signal, if the transmission power of the discovery signal is equal or greater than a first threshold value, then the transmission power is determined to be H and the discovery signal including 11 is transmitted, if the transmission power of the discovery signal is less than the first threshold value and is equal or greater than a second threshold value, then the transmission power is determined to be M and the discovery signal including 10 is transmitted, and if the transmission power is less than the second threshold value, then the transmission power is determined to be L and the discovery signal including 01 is transmitted.

In the user apparatus UE which has received the above discovery signal, an indicator included in the discovery signal is extracted and the transmission power is determined by the indicator. For example, if the indicator is H:11, then the transmission power is determined to be 23 dBm, if the indicator is M:10, then the transmission power is determined to be 20 dBm, and if the indicator is L:01, then the transmission power is determined to be 15 dBm. The above values, 23 dBm, 20 dBm, and 15 dBm are predetermined values.

Figure 5:
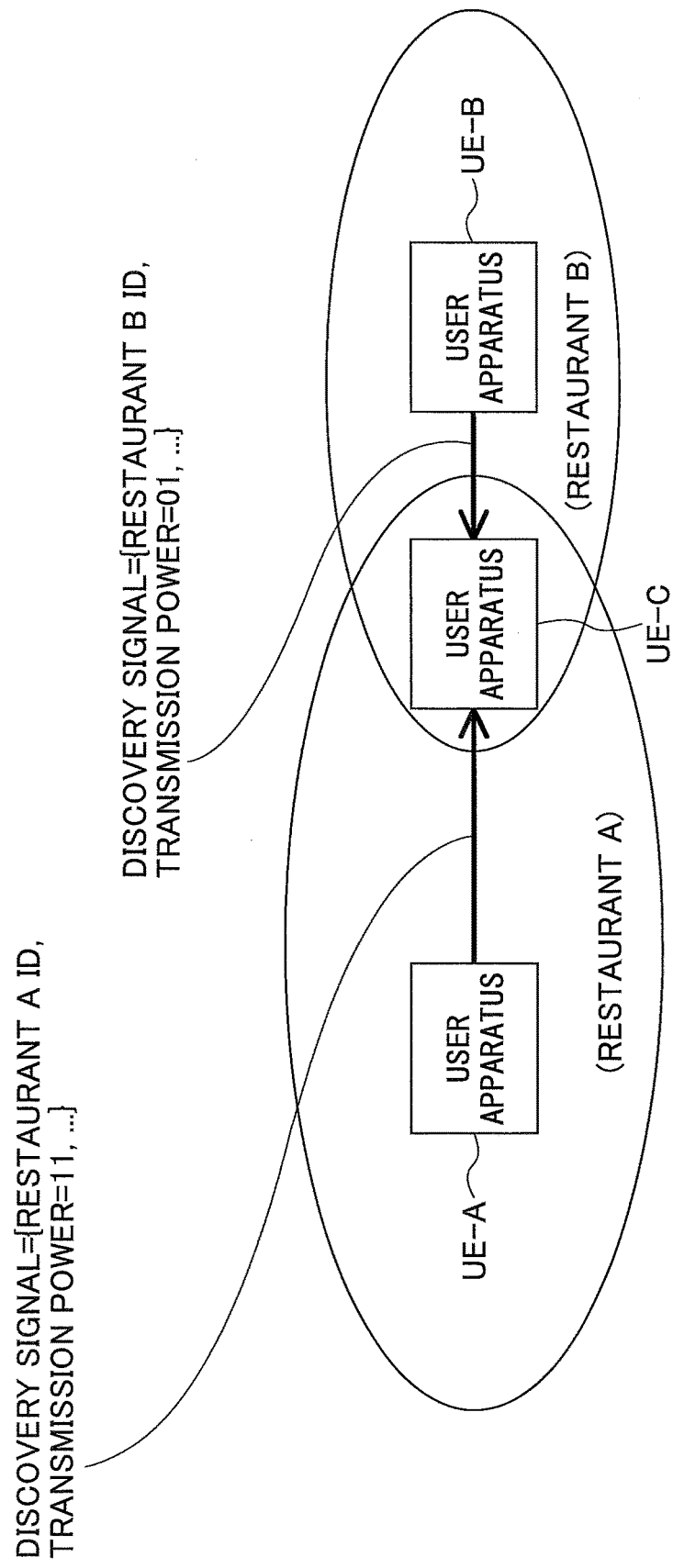
FIG. 5 is a drawing illustrating a process outline of a first embodiment.

In FIG. 5, an example of a process in the first embodiment is shown. As shown in FIG. 5, a user apparatus UE-A (restaurant A) transmits a discovery signal including its identification information and a transmission power indicator=11. Also, a user apparatus UE-B (restaurant B) transmits a discovery signal including its identification information and a transmission power indicator=01. A user apparatus UE-C discovers the user apparatus UE-A and the user apparatus UE-B by receiving the discovery signal from the user apparatus UE-A and the discovery signal from the user apparatus UE-B.

The user apparatus UE-C estimates transmission power of the discovery signal as 23 dBm (H) from the indicator included in the discovery signal from the user apparatus UE-A (restaurant A), and estimates transmission power of the discovery signal as 15 dBm (L) from the indicator included in the discovery signal from the user apparatus UE-B (restaurant B). Then, the user apparatus UE-C can estimate a distance between UE-C and the user apparatus UE-A (restaurant A) and a distance between UE-C and the user apparatus UE-B (restaurant B) based on the transmission power and the receive power of the corresponding discovery signals. Here, it is estimated that the distance between UE-C and the user apparatus UE-A (restaurant A) is longer than the distance between UE-C and the user apparatus UE-B (restaurant B).

It should be noted that the quantization described above is just an example. Finer quantization may be applied, or the value of the transmission power itself may be included in the discovery signal.

<Apparatus Configuration>

Figure 6:
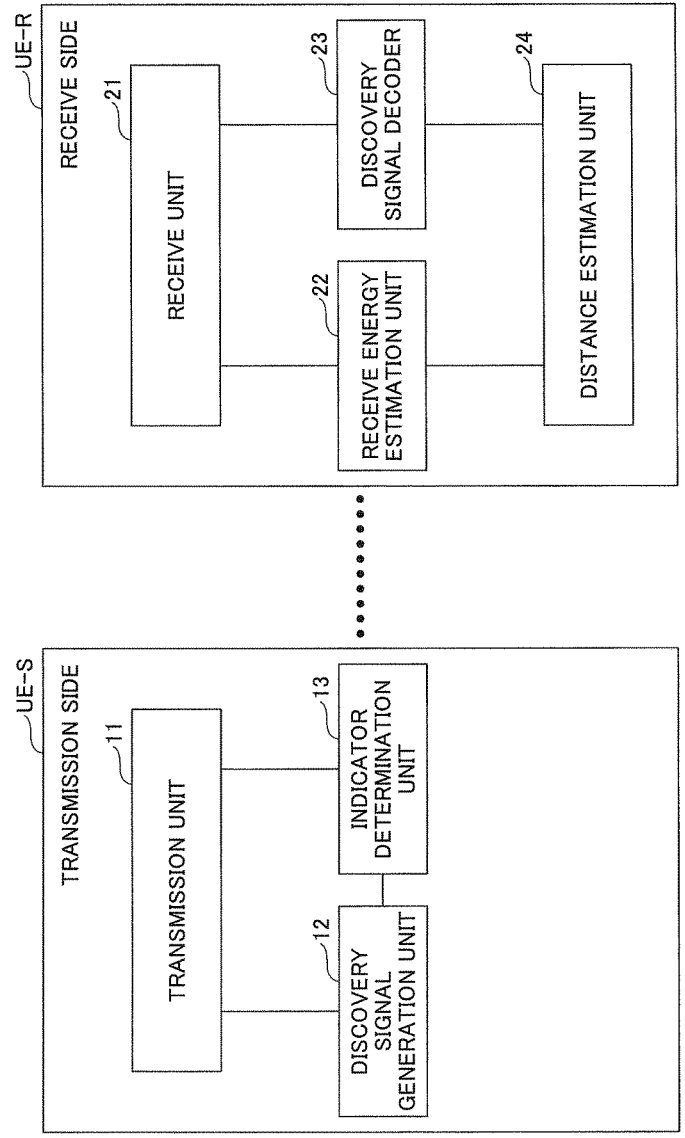
FIG. 6 is a functional configuration diagram of a user apparatus UE in the first embodiment.

FIG. 6 shows a functional configuration diagram of the user apparatus UE according to the present embodiment. In an example shown in FIG. 6, a user apparatus UE-S which is a transmission side of the discovery signal and a user apparatus UE-R which is a receive side of the discovery signal are shown separately, but a user apparatus UE may include both a function for transmitting the discovery signal and a function for estimating a distance from the received discovery signal. Also, referring to the configuration shown in FIG. 6, a function related to transmitting the discovery signal is specifically shown for the user apparatus UE-S, and a function related for estimating a distance by receiving the discovery signal is specifically shown for the user apparatus UE-R. It is assumed that both UE-S and UE-R include existing functions such as a function for transmitting/receiving a wireless signal, and a function for inputting/outputting information which functions are necessary for a terminal used by a user. Similar assumptions may be applied to other embodiments.

The user apparatus UE-S includes a transmission unit 11, a discovery signal generation unit 12 and an indicator determination unit 13. The transmission unit 11 transmits a discovery signal wirelessly by using a predetermined radio resource. The indicator determination unit 13 determines an indicator which should be included in the discovery signal based on transmission power used for discovery signal transmission, and transmits the indicator to the discovery signal generation unit 12. The discovery signal generation unit 12 generates a discovery signal including the indicator and identification information of the user apparatus UE-S.

The user apparatus UE-R includes a receive unit 21, a receive energy estimation unit 22, a discovery signal decoder 23, and a distance estimation unit 24.

The receive unit 21 receives a discovery signal by using a predetermined radio resource. The receive energy estimation unit 22 measures receive power of the received discovery signal and transmits the value of the receive power to the distance estimation unit 24. It should be noted that the value measured by the receive energy estimation unit 22 is not limited to the receive power and may be receive signal strength, electric field strength at a receive point, or the like. Information related to receive power as shown above which can be used for distance estimation may be referred to as receive power information.

The discovery signal decoder 23 extracts from the received discovery signal the identification information of the transmitting user apparatus UE and the indicator of the transmission power, further determines the transmission power from the indicator, and transmits the identification information and the transmission power to the distance estimation unit 24. It should be noted that, for example, the discovery signal decoder 23 includes a memory unit for storing a transmission power value associated with each of the indicators, and determines the transmission power corresponding to the indicator by referring to the memory unit.

The distance estimation unit 24 estimates a distance between the user apparatus UE which has transmitted the discovery signal and the user apparatus itself from the receive power and the transmission power. It should be noted that the calculating a distance by using the receive power, the transmission power, and the like is a common technology.

<Process Flow of User Apparatus UE for Distance Estimation>

Figure 7:
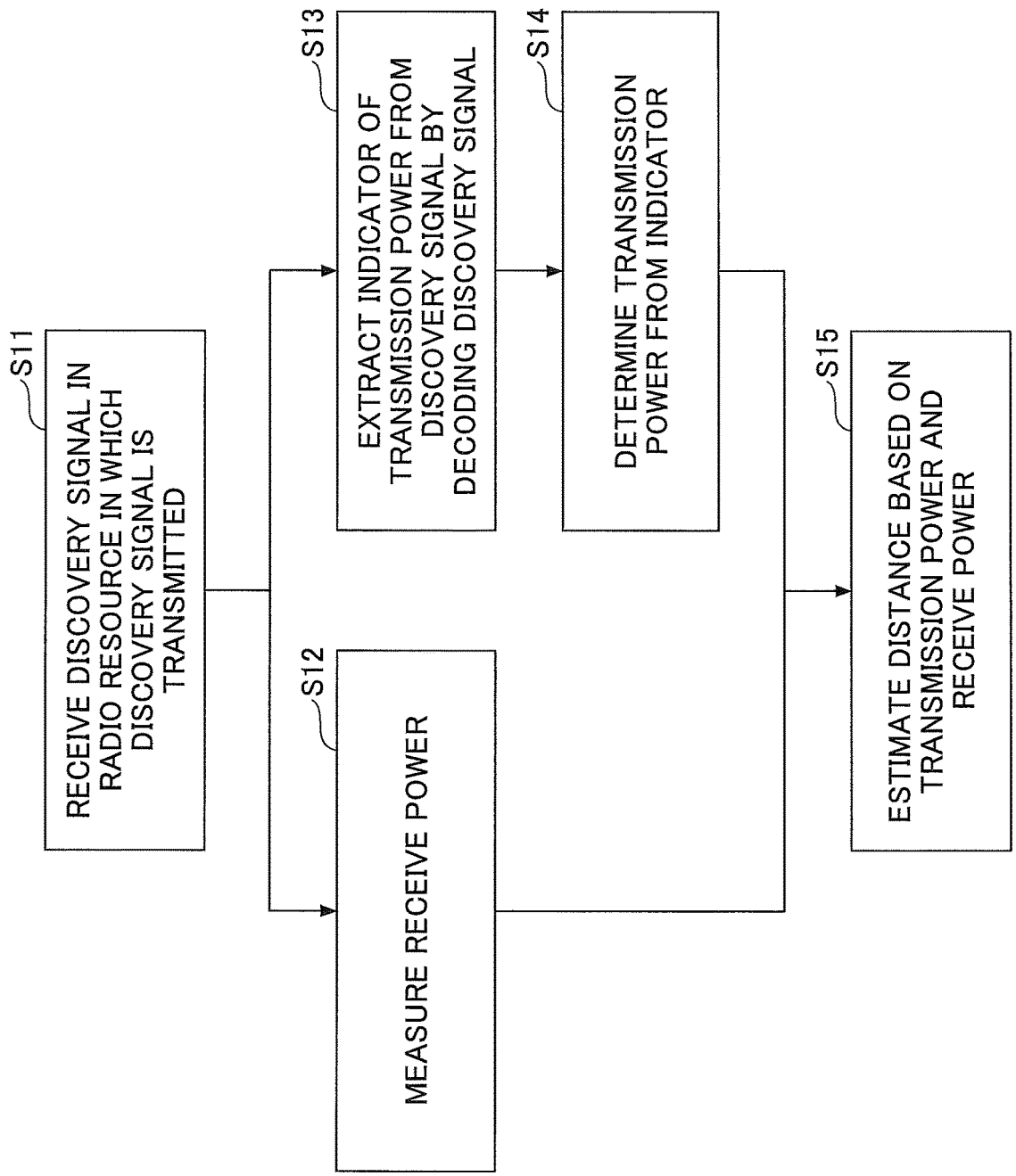
FIG. 7 is a flowchart illustrating operations of a user apparatus UE-R in the first embodiment.

Next, referring to the flowchart shown in FIG. 7, a procedure of the user apparatus UE-R for estimating, based on the received discovery signal, a distance to the user apparatus UE which has transmitted the discovery signal will be described.

First, the receive unit 21 of the user apparatus UE-R receives the discovery signal in the wireless resource in which the discovery signal is transmitted (step 11).

The receive energy estimation unit 22 measures the receive power in the wireless resource and transmits the measured value to the distance estimation unit 24 (step 12). On the other hand, the discovery signal decoder 23 decodes the discovery signal, extracts an indicator of the transmission power along with identification information (step 13), determines the transmission power from the indicator, and transmits the determined transmission power to the distance estimation unit 24 (step 14). Then, the distance estimation unit 24 estimates a distance between the user apparatus UE discovered by the discovery signal (the user apparatus UE identified by the identification information included in the discovery signal) and the user apparatus UE-R itself based on receive power received from the receive energy estimation unit 22 and the transmission power received from the discovery signal decoder 23 (step 15).

Compared to other embodiments, the present embodiment has an advantage in which each user apparatus can freely determine transmission power of the own discovery signal, include the information of the determined transmission power into the discovery signal, and transmit the discovery signal.

(Second Embodiment)

Next, a second embodiment of the present invention will be described.

<Process Content>

In the second embodiment, the user apparatus UE which receives the discovery signal estimates the transmission power of the discovery signal based on information transmitted from a mobile communication network.

For example, in the present embodiment, for each of services, multiple classes related to transmission power are predetermined. As an example (which is just an example), for an advertisement service, three classes of transmission power are defined as follows: long (distance): 26 dBm, medium: 23 dBm, short: 20 dBm. For a local print service, three classes of transmission power are defined as follows: long: 23 dBm, medium: 20 dBm, short: 18 dBm.

A base station BS transmits classes used for transmission power to user apparatuses UEs in its cell. The class which should be used is determined by the base station BS according to, for example, environment, a number or a density of user apparatuses UEs. Each user apparatus transmits a discovery signal with transmission power corresponding to a class transmitted by the base station BS.

Each user apparatus can estimate transmission power of a discovery signal received from another user apparatus UE because each user apparatus understands the classes by signaling from the base station BS. For example, in the case where the above example classes are applied, in the case where a discovery signal is received from a user apparatus UE related to the advertisement service, understanding that, for example, "Class: long" has been transmitted by the base station BS, the user apparatus UE estimates 26 dBm corresponding to "Class: long" in the advertisement service as the transmission power of the discovery signal, and estimates a distance from this 26 dBm and receive power. It should be noted that the service can be identified by, for example, identification information of the user apparatus UE included in the discovery signal. Also, identification information of the service may be included in the discovery signal separately from the identification information of the user apparatus UE so that the service is identified from this identification information of the service. Also, the classes may be defined regardless of the services.

Figure 8:
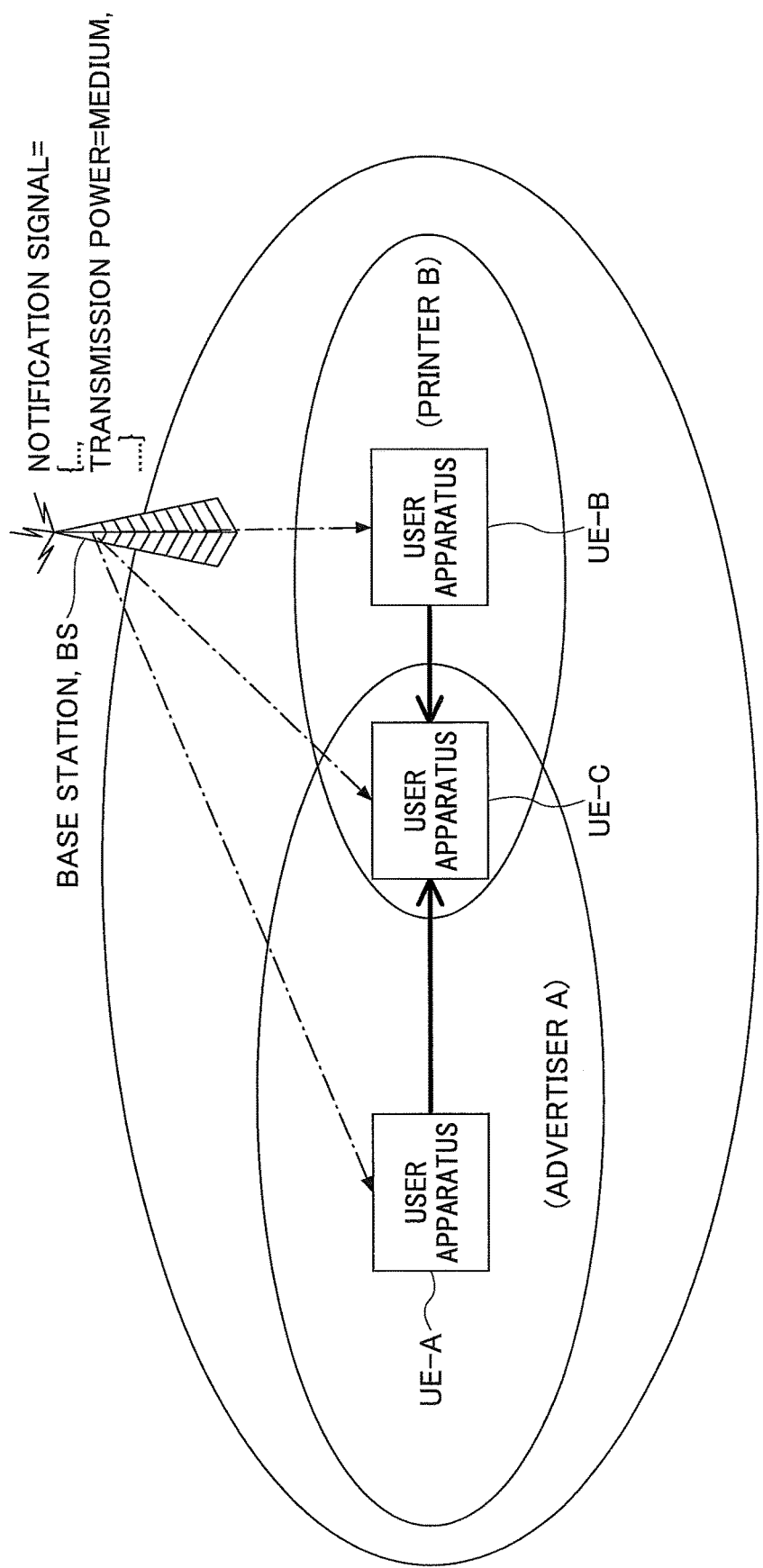
FIG. 8 is a drawing illustrating a process outline of a second embodiment.

In FIG. 8, an example of a process in the second embodiment is shown. As shown in FIG. 8, in this example, a notification message (broadcast message) including "medium" as a class of transmission power is transmitted from the base station BS to each of the user apparatuses UEs. As a result, the user apparatus UE-C can estimate that the transmission power of the discovery signal from the user apparatus UE-A related to the advertisement service is 23 dBm corresponding to "medium" of the advertisement service, and that the transmission power of the discovery signal from the user apparatus UE-B related to the local print service is 20 dBm corresponding to "medium" of the local print service.

It should be noted that although in the present embodiment, an example is shown as described above in which transmission power is classified, classified information (information which can be estimated by the user apparatus UE based on the class notification from the base station BS) is not limited to transmission power, and may be a set of transmission power and transmission antenna gain, transmission antenna gain, or the like. Information such as transmission power, a set of transmission power and transmission antenna gain, transmission antenna gain, or the like, which can be used for distance estimation at a receive side of a signal, may be referred to as transmission power information. In other words, the user apparatus UE, which has received a discovery signal, estimates a distance by using the transmission power information and receive power information.

Also, in the present invention, a channel used by the base station BS for transmitting classes is not limited to a specific kind of channel.

For example, it may be assumed that the classes are transmitted by using RRC signaling, PDCCH, ePDCCH, system information, or the like as defined in LTE, LTE-Advanced, or the like. Also, when using the channels described above, the classes may be transmitted by being included in information of existing signaling, or by defining a new signaling. Also, it may be assumed that the classes are transmitted by using a signal of Fractional TPC which controls target value of the transmission power control at the user apparatus UE.

<Configuration of Base Station, BS>

Figure 9:
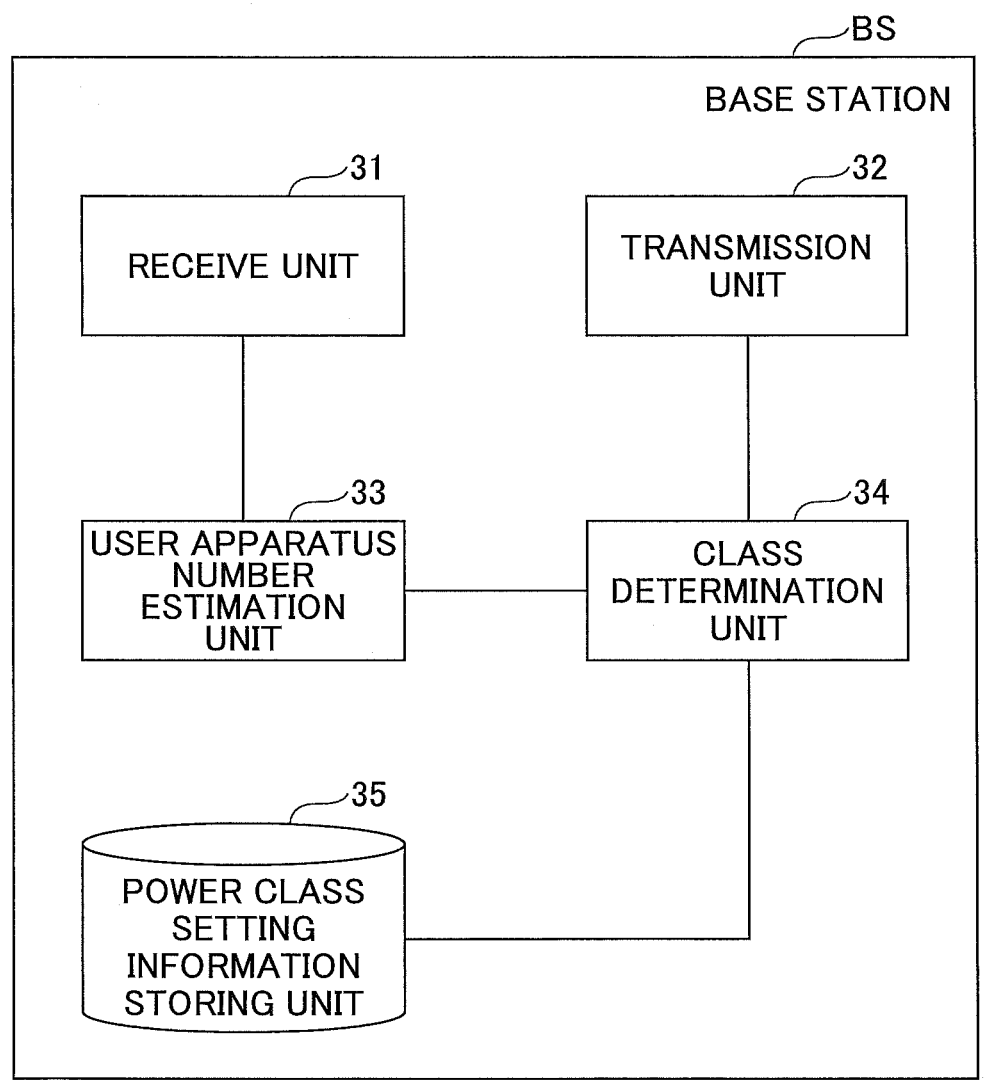
FIG. 9 is a functional configuration diagram of a base station BS in the second embodiment.

FIG. 9 shows a functional configuration diagram of the base station BS according to the present embodiment. It should be noted that this configuration is an exemplary configuration in a case where the class of the transmission power is determined by a number (density) of the user apparatuses UEs. Also, FIG. 9 specifically shows a configuration in which the class of the transmission power is determined by the base station BS.

As shown in FIG. 9, the base station BS according to the present embodiment includes a receive unit 31, a transmission unit 32, a user apparatus number estimation unit 33, a class determination unit 34, and a power class setting information storing unit 35. The receive unit 31, by monitoring a radio resource in which a discovery signal is transmitted, receives a discovery signal transmitted by a user apparatus UE which is under the service of the base station BS. The transmission unit 32 transmits a class of transmission power to the user apparatus UE which is under the service of the base station BS.

The user apparatus number estimation unit 33 estimates a number of user apparatuses UEs which transmit a discovery signal under the service of the base station BS based on the discovery signals received by the receive unit 31. For example, the number of, user apparatuses UEs is estimated from a number of items of identification information included in discovery signals received within a predetermined period of time. In the power class setting information storing unit 35, profile information in which the number of user apparatuses is associated with the class is stored. This profile information may be stored in advance in the power class setting information storing unit 35, or may be obtained by the base station BS (e.g., the class determination unit 34) arbitrarily from an external apparatus, or the like and stored in the power class setting information storing unit 35.

The class determination unit 34 determines a class based on the number of user apparatuses UEs estimated by the user apparatus number estimation unit 33 and the profile information stored in the power class setting information storing unit 35, and, by using the transmission unit 32, transmits the determined class to the user apparatuses UEs by using a notification signal, or the like (e.g., system information).

<Operation of Base Station BS>

Figure 10:
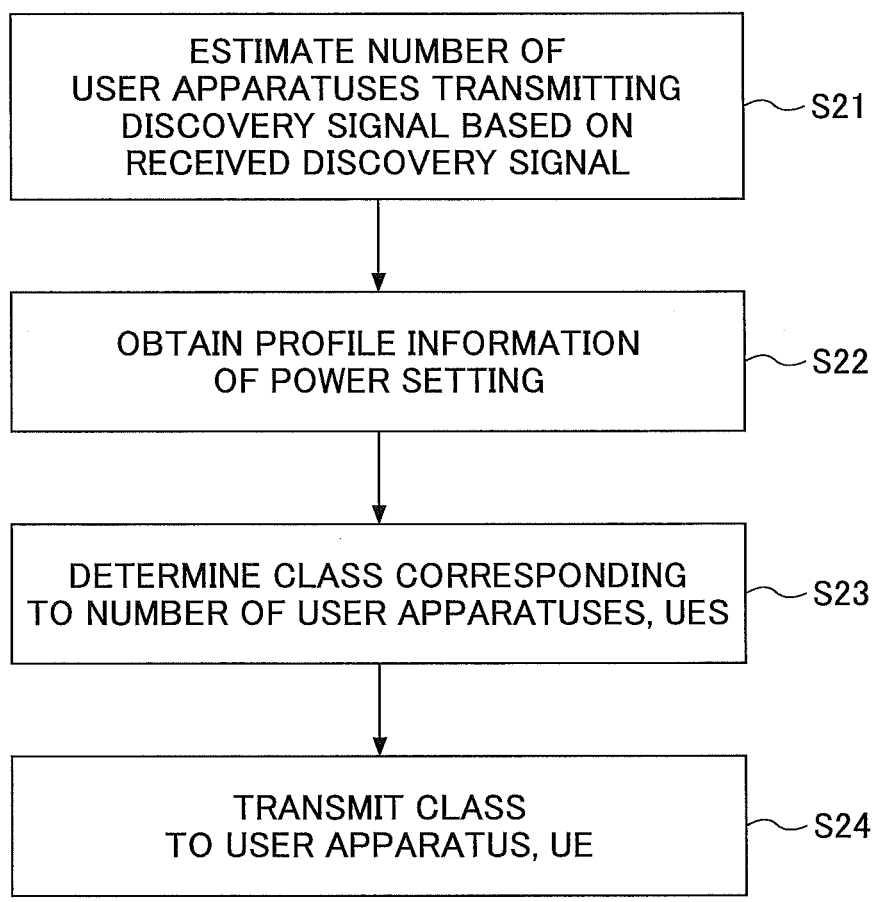
FIG. 10 is a flowchart illustrating operations of the base station BS in the second embodiment.

Next, referring to FIG. 10, a process of the base station BS which includes a configuration shown in FIG. 9 will be described. The receive unit 31 of the base station BS receives discovery signals by monitoring the radio resource in which the discovery signals are transmitted, and the user apparatus number estimation unit 33 estimates a number of user apparatuses UEs transmitting a discovery signal based on the received discovery signals (step 21).

The class determining unit 34 obtains the profile information described above and stores it in the power class setting information storing unit 35 (step 22). This profile information is information which defines which class should be used according to the number of user apparatuses UEs. It should be noted that this profile information is related to, for example, a location of the base station BS (indoor, outdoor, etc.). In the case where the profile information is already stored in the power class setting information storing unit 35, it is not necessary to obtain the profile information.

The class determination unit 34 obtains a class corresponding to the number of user apparatuses UEs estimated by the user apparatus number estimation unit 33 by referring to the profile information (step 23). Then, the transmission unit 32 transmits the class determined by the class determination unit 34 to the user apparatuses UEs under the service of the base station BS by using, for example, a notification signal (cell broadcasting) (step 24).

<Configuration of User Apparatus UE>

Figure 11:
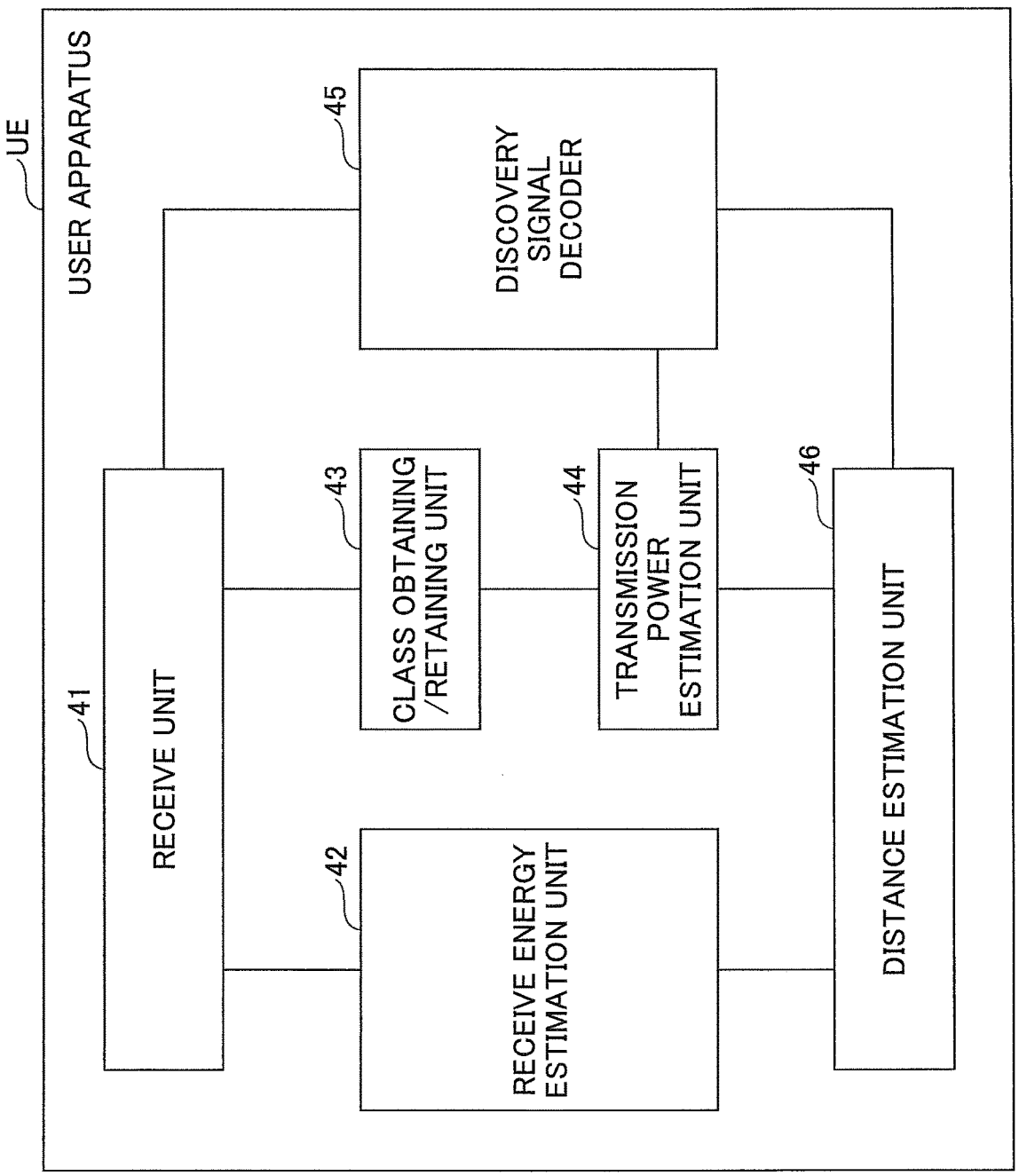
FIG. 11 is a functional configuration diagram of a user apparatus UE in the second embodiment.

FIG. 11 shows a functional configuration diagram of the user apparatus UE according to the present embodiment. FIG. 11 especially shows a function for estimating a distance by receiving a discovery signal at the user apparatus UE.

The user apparatus UE includes a receive unit 41, a receive energy estimation unit 42, a class obtaining/retaining unit 43, a transmission power estimation unit 44, a discovery signal decoder 45, and a distance estimation unit 46. The receive unit 41 receives a discovery signal in a predetermined radio resource. The receive energy estimation unit 42 measures receive power of the received discovery signal and transmits the value of the receive power to the distance estimation unit 46. It should be noted that the value measured by the receive energy estimation unit 42 is not limited to the receive power and may be receive signal strength, electric field strength at a receive point, or the like. Information related to receive power as shown above which can be used for distance estimation may be referred to as receive power information.

The class obtaining/retaining unit 43 obtains a class from a signal received from the base station BS (e.g., a signal of a higher layer, a notification signal described above) and retains it in a memory unit such as a memory. The transmission power estimation unit 44 determines transmission power corresponding to the class regarding the service of the discovery signal and transmits the determined transmission power to the distance estimation unit 46.

For example, the transmission power estimation unit 44, retaining in a memory unit such as a memory values of transmission power associated with service types and classes, estimates the transmission power based on the class obtained from the class obtaining/retaining unit 43 and the service type determined from identification information extracted by the discovery signal decoder 45.

The discovery signal decoder 45 extracts identification information of the transmitting user apparatus UE from the received discovery signal. The distance estimation unit 46 estimates a distance between the user apparatus UE which has transmitted the discovery signal and the user apparatus itself.

<Process Flow of User Apparatus UE for Distance Estimation>

Figure 12:
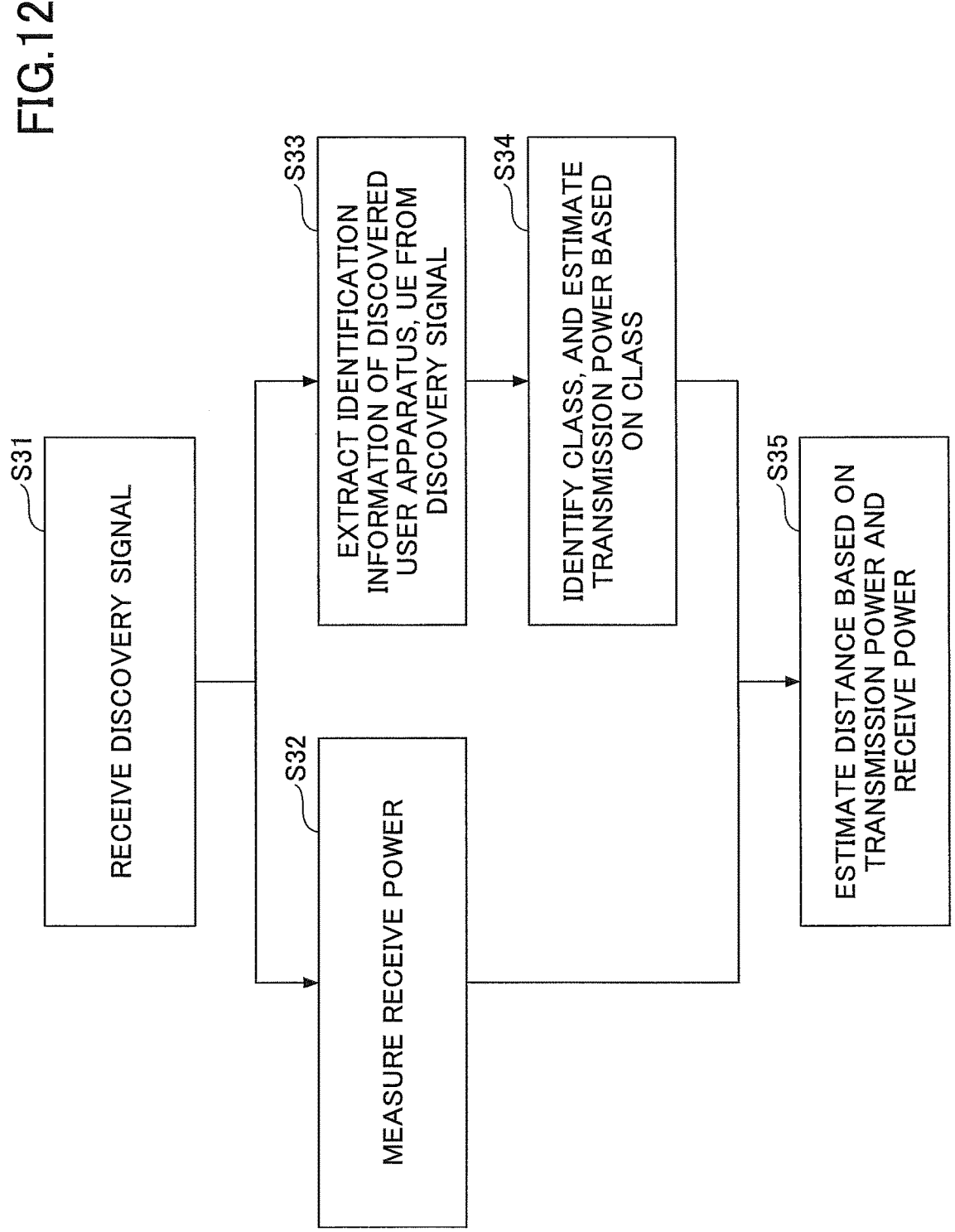
FIG. 12 is a flowchart illustrating operations of the user apparatus UE in the second embodiment.

Next, referring to the flowchart shown in FIG. 12, a process of the user apparatus UE for estimating, based on the received discovery signal, a distance to the user apparatus UE which has transmitted the discovery signal will be described. In the following procedure, it is assumed that the class obtaining/retaining unit 43 of the user apparatus UE has already extracted the class from, for example, a higher layer signal received from the base station BS and retained it.

First, the receive unit 41 of the user apparatus UE receives a discovery signal by using a radio resource in which the discovery signal is transmitted (step 31).

The receive energy estimation unit 42 measures the receive power in the radio resource and transmits the measured value to the distance estimation unit 46 (step 32). On the other hand, the discovery signal decoder 45 extracts the identification information of the user apparatus UE from the discovery signal by decoding the discovery signal, and transmits the extracted identification information to the transmission power estimation unit 44 (step 33). The transmission power estimation unit 44, along with determining the service type from the identification information, obtains the class from the class obtaining/retaining unit 43, determines the transmission power from the service type and the class, and transmits the determined transmission power to the distance estimation unit 46 (step 34).

Then, the distance estimation unit 46 estimates a distance between the user apparatus UE discovered by the discovery signal (the user apparatus UE identified by the identification information included in the discovery signal) and the user apparatus UE itself based on receive power received from the receive energy estimation unit 42 and the transmission power received from the transmission power estimation unit 44 (step 35).

Compared with other embodiments, the present embodiment has a benefit in which it is easier for an operator (carrier) to control and it is not necessary to include additional information in the discovery signal.

(Third Embodiment)

Next, a third embodiment of the present invention will be described.

<Process Content>

In the third embodiment, a user apparatus UE estimates transmission power of a discovery signal of another user apparatus UE from an uplink signal transmitted by the other user apparatus UE to a base station BS. In other words, the user apparatus UE receives (overhears) an uplink signal (UL signaling, including identification information of the other user apparatus UE) transmitted by the other user apparatus UE to the base station BS, and estimates from the received signal the transmission power of the discovery signal of the other user apparatus UE.

For example, the user apparatus UE measures receive power of the uplink signal transmitted by the other user apparatus UE, and estimates the transmission power of the discovery signal from the other user apparatus UE based on the measured receive power. For example, in the case where the uplink signal is received with high receive power, it can be assumed that there is little interference and also it can be assumed that the transmission power of the discovery signal is high. It should be noted that this is just an example.

Also, as another example, in the uplink signal transmitted by the other user apparatus UE, the identification information of the other user apparatus UE and information of transmission power of the discovery signal transmitted by the other user apparatus UE (e.g., the indicator described in the first embodiment, or a value of transmission power itself) may be included so that the user apparatus UE which receives the uplink signal may obtain the information of transmission power of the discovery signal transmitted by the other user apparatus UE from the uplink signal.

Figure 13:
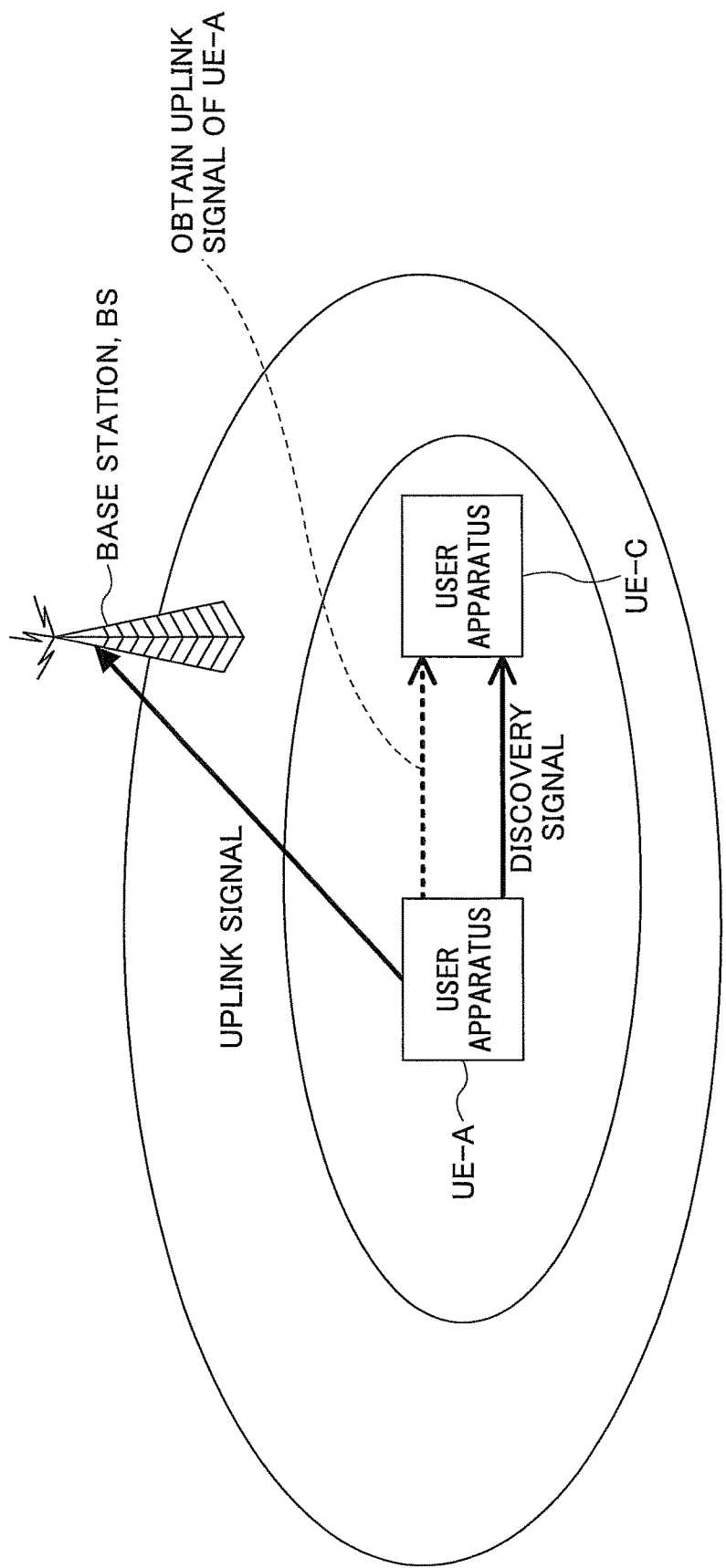
FIG. 13 is a drawing illustrating a process outline of a third embodiment.

In FIG. 13, an example of a process in the third embodiment is shown. In the example shown in FIG. 13, a user apparatus UE-A transmits an uplink signal to a base station BS and a user apparatus UE-C receives (overhears) the uplink signal. Also, the user apparatus UE-C receives a discovery signal from the user apparatus UE-A. The user apparatus UE-C estimates or obtains transmission power of the discovery signal of the user apparatus UE-A based on the uplink signal transmitted from the user apparatus UE-A, and estimates a distance from receive power of the discovery signal.

It should be noted that although, as described above, in the present embodiment, an example is shown in which transmission power is estimated or obtained, the information estimated or obtained is not limited to transmission power information, but may be, for example, a set of transmission power and transmission antenna gain, or transmission antenna gain. Information such as transmission power, a set of transmission power and transmission antenna gain, transmission antenna gain, or the like, which can be used for distance estimation at a receive side of a signal, may be referred to as transmission power information. In other words, the user apparatus UE, which has received a discovery signal, estimates a distance by using the transmission power information and receive power information.

Also, in the above example, the timing at which the user apparatus UE-C receives the uplink signal transmitted from the user apparatus UE-A may be any timing as long as it is before estimating the distance to the user apparatus UE-A. For example, the user apparatus UE-C may receive the uplink signal transmitted from the user apparatus UE-A at the timing before estimating the distance to the user apparatus UE-A, estimate or obtain transmission power of the discovery signal of the user apparatus UE-A, store the transmission power of the discovery signal together with identification information of the user apparatus UE-A in a memory unit such as a memory, and, at the timing when estimating the distance to the user apparatus UE-A, read and use the transmission power of the discovery signal of the user apparatus UE-A.

<Configuration of User Apparatus, UE>

Figure 14:
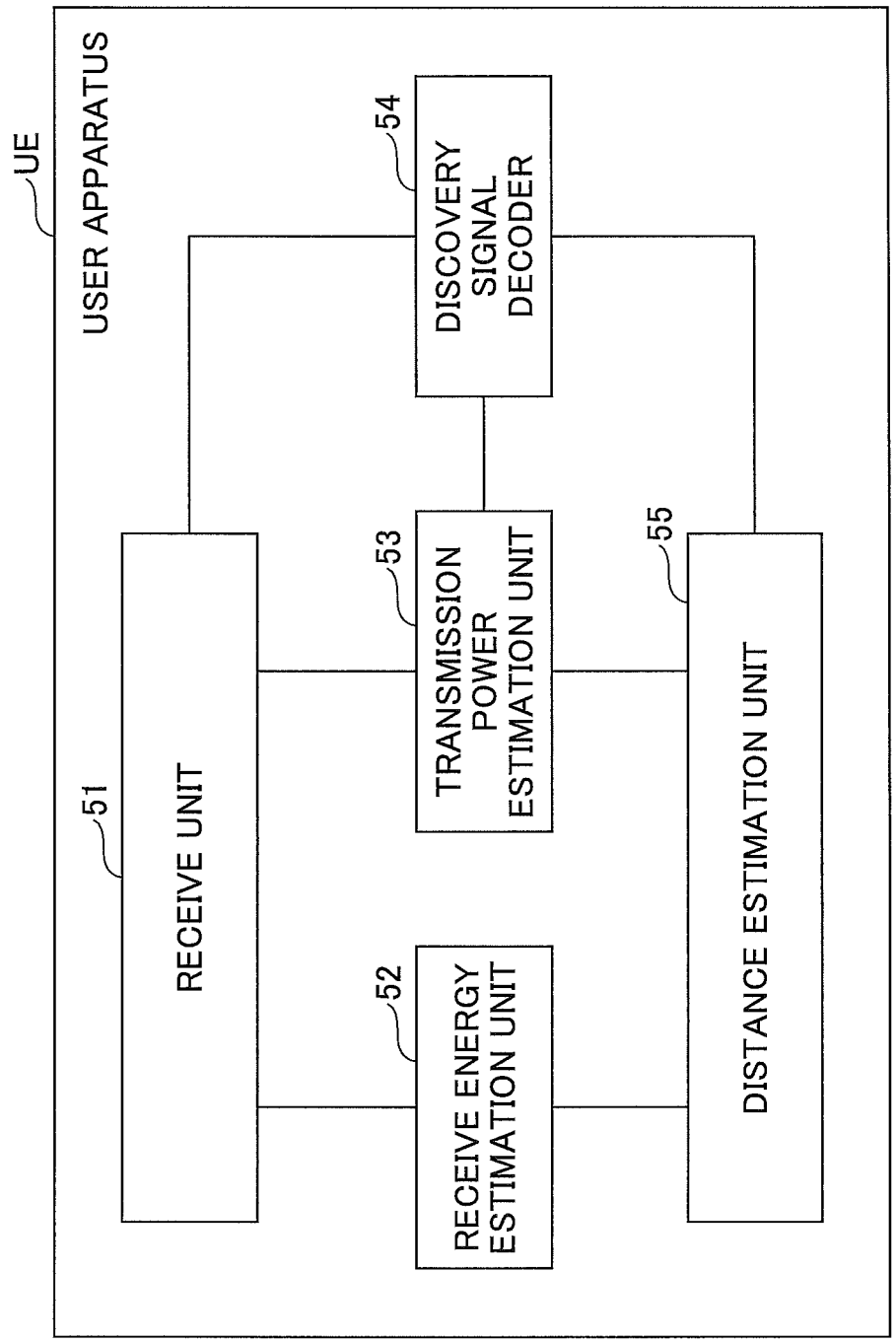
FIG. 14 is a functional configuration diagram of a user apparatus UE in the third embodiment.

FIG. 14 shows a functional configuration diagram of the user apparatus UE according to the present embodiment. FIG. 14 especially shows a function for estimating a distance by receiving a discovery signal at the user apparatus UE.

The user apparatus UE includes a receive unit 51, a receive energy estimation unit 52, a transmission power estimation unit 53, a discovery signal decoder 54, and a distance estimation unit 55. The receive unit 51 receives a discovery signal in a predetermined radio resource. The receive energy estimation unit 52 measures receive power of the received discovery signal and transmits the value of the receive power to the distance estimation unit 55. It should be noted that the value measured by the receive energy estimation unit 52 is not limited to the receive power and may be receive signal strength, electric field strength at a receive point, or the like. Information related to receive power as shown above which can be used for distance estimation may be referred to as receive power information. The transmission power estimation unit 53 obtains an uplink signal which is transmitted by another user apparatus UE and received by the receive unit 51, estimates or obtains transmission power of the discovery signal from the uplink signal, and transmits to the distance estimation unit 55 the transmission power corresponding to identification information of the user apparatus UE which is reported by the discovery signal decoder 54.

The discovery signal decoder 54 extracts the identification information of the transmitting user apparatus UE from the received discovery signal and transmits the extracted identification information to the transmission power estimation unit 53. The distance estimation unit 55 estimates a distance between the user apparatus UE which has transmitted the discovery signal and the user apparatus itself.

<Process Flow of User Apparatus UE for Distance Estimation>

Figure 15:
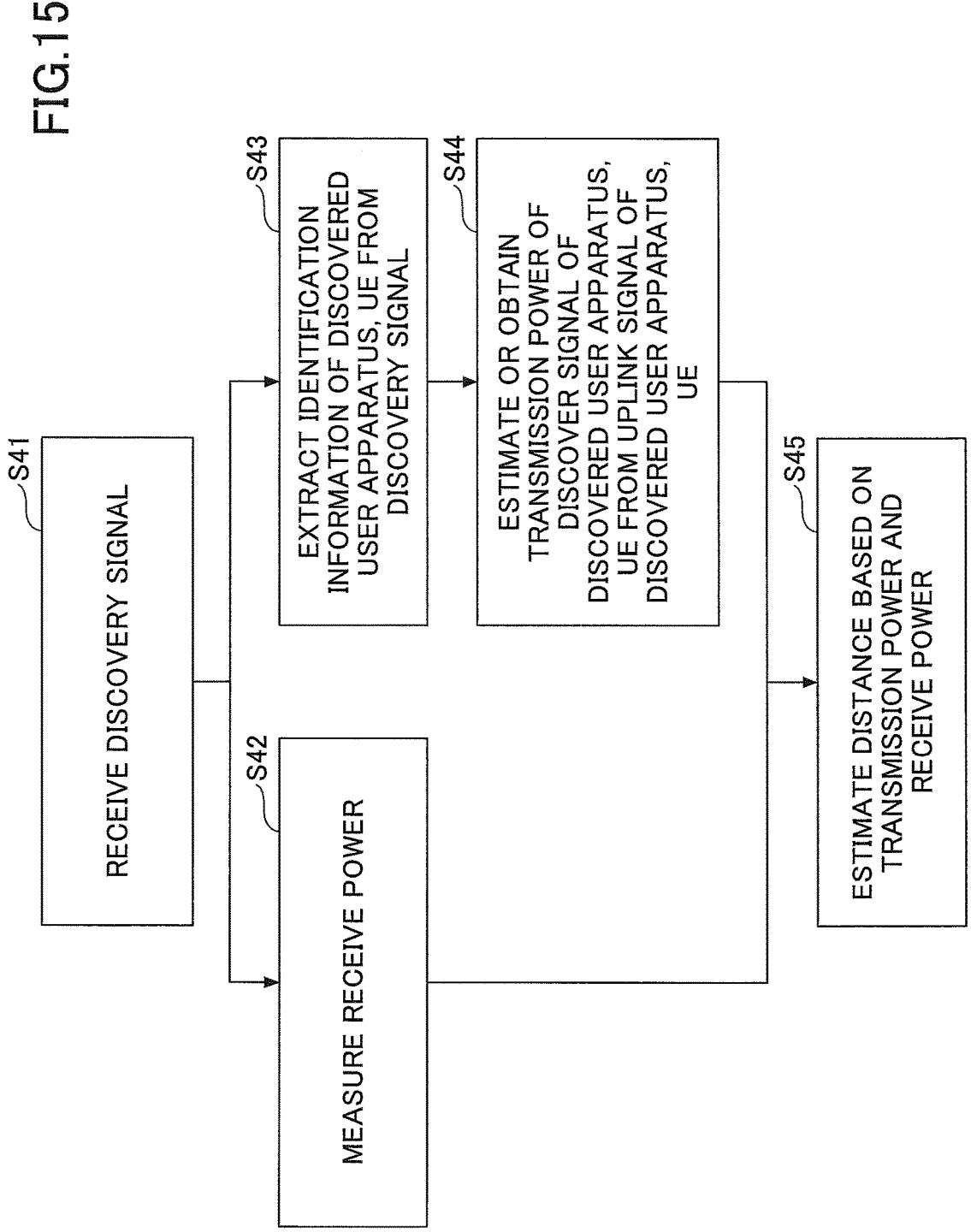
FIG. 15 is a flowchart illustrating operations of the user apparatus UE in the third embodiment.

Next, referring to the flowchart shown in FIG. 15, a process of the user apparatus UE for estimating, based on the received discovery signal, a distance to the user apparatus UE which has transmitted the discovery signal will be described.

First, the receive unit 51 of the user apparatus UE receives a discovery signal in a radio resource in which the discovery signal is transmitted (step 41).

The receive energy estimation unit 52 measures the receive power in the wireless resource and transmits the measured value to the distance estimation unit 55 (step 42). On the other hand, the discovery signal decoder 54 extracts the identification information of the user apparatus UE from the discovery signal by decoding the discovery signal, and transmits the extracted identification information to the transmission power estimation unit 53 (step 43).

Transmission power estimation unit 53 obtains the uplink signal received by the receive unit 51, from the uplink signal of another user apparatus UE corresponding to the identification information transmitted by the discovery signal decoder 54, estimates or obtains transmission power of the discovery signal of the other user apparatus UE, and transmits the transmission power to the distance estimation unit 55.

Then, the distance estimation unit 55 estimates a distance between the user apparatus UE discovered by the discovery signal and the user apparatus UE itself based on receive power received from the receive energy estimation unit 52 and the transmission power received from the transmission power estimation unit 53 (step 45).

Compared with other embodiments, the present embodiment has an advantage in which signaling cost is low.

(Fourth Embodiment)

Next, a fourth embodiment of the present invention will be described.

<Process Content>

In the fourth embodiment, the user apparatus UE requests from the base station BS the transmission power of the discovery signal of another user apparatus UE, and the base station BS returns the transmission power to the requesting user apparatus UE. As a result, the user apparatus UE can obtain transmission power of the discovery signal of the other user apparatus UE and estimate a distance to the other user apparatus UE.

Figure 16:
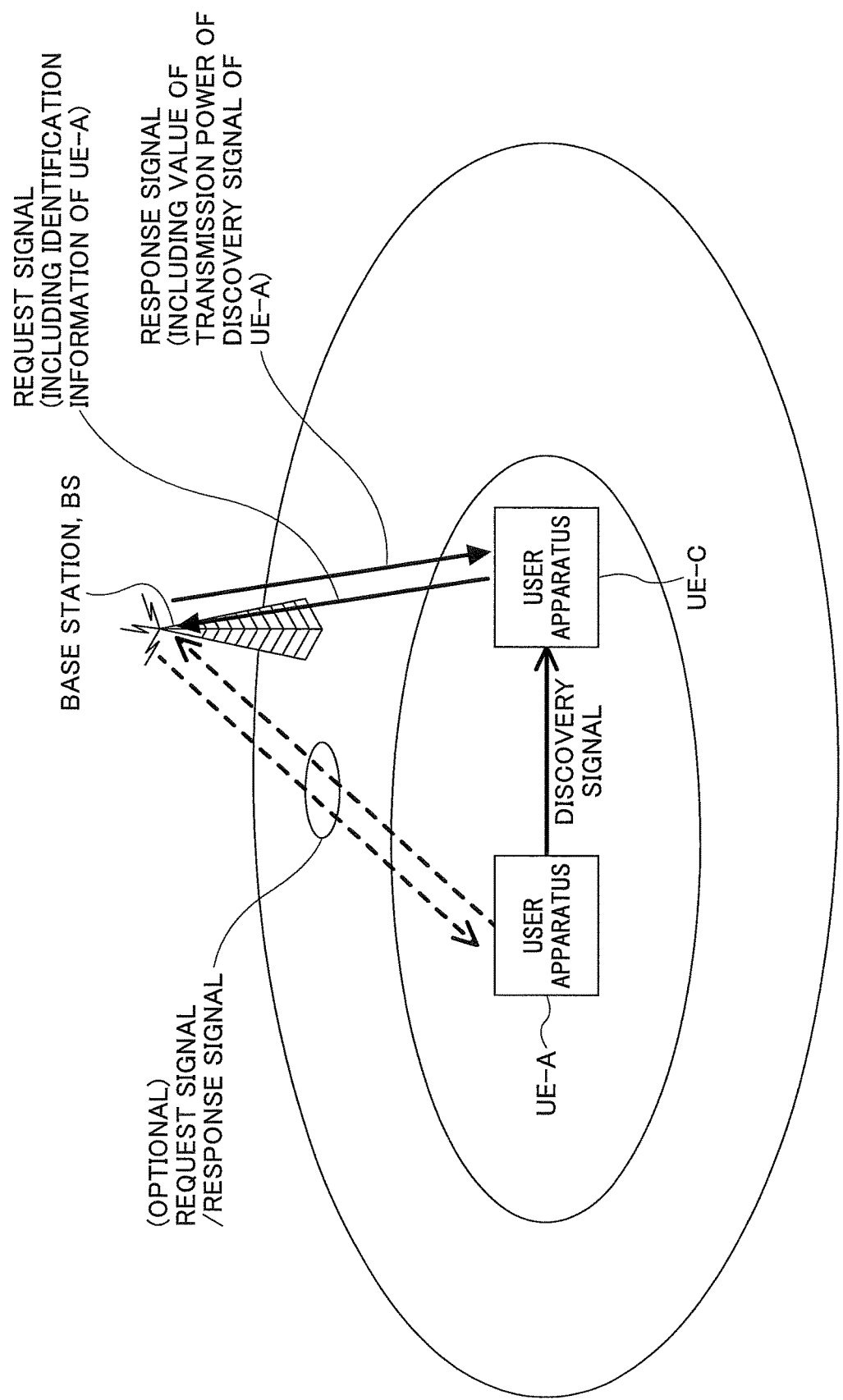
FIG. 16 is a drawing illustrating a process outline of a fourth embodiment.

In FIG. 16, an example of a process in the fourth embodiment is shown. In this example, first, the user apparatus UE-C receives a discovery signal from the user apparatus UE-A. Then, in the case where the user apparatus UE-C wants to know the distance between itself and the discovered user apparatus UE-A, the user apparatus UE-C transmits a request signal requesting for transmission power of the discovery signal of the user apparatus UE-A to the base station BS. In the request signal, identification information of the user apparatus UE-A is included. The base station BS which has received the request signal returns a response signal including a value of the transmission power of the discovery signal of the user apparatus UE-A to the user apparatus UE-C.

It should be noted that the above example is one in which the base station BS retains the value of the transmission power of the discovery signal of the user apparatus UE-A, or the base station BS is capable of estimating the value. In the case where the base station BS does not retain the value of the transmission power of the discovery signal of the user apparatus UE-A and the base station BS is incapable of estimating the value, as shown in dotted lines in FIG. 16, the base station BS transmits a request signal requesting transmission power of discovery signal to the discovered user apparatus UE-A, the user apparatus UE-A which has received the request signal returns a response signal including a value of transmission power of discovery signal of the user apparatus UE-A to the base station BS, and the base station BS which has received the response signal transmits a response signal including the value of the transmission power included in the response signal of the user apparatus UE-A to the user apparatus UE-C.

It should be noted that although, as described above, in the present embodiment, an example is shown in which transmission power is obtained by the request signal/response signal, the obtained information is not limited to transmission power information, but may be, for example, a set of transmission power and transmission antenna gain, or transmission antenna gain. Information such as transmission power, a set of transmission power and transmission antenna gain, transmission antenna gain, or the like, which can be used for distance estimation at a receive side of a signal, may be referred to as transmission power information. In other words, the user apparatus UE, which has received a discovery signal, estimates a distance by using the transmission power information and receive power information.

In the present invention, a channel or a signaling method used for transmission and reception of the above request signal/response signal is not limited to a specific channel or method. For example, RRC signaling, PDCCH, ePDCCH, PUCCH, or the like, which is specified in LTE, LTE-Advanced, etc., may be used. Also, a new signaling procedure may be defined for the above request signal/response signal, or necessary information may be included in a signal of the existing signaling.

It should be noted that it is not limited to the base station BS from which the user apparatus UE requests the transmission power of the discovery signal of the user apparatus UE (destination of the request signal), and, for example, the user apparatus UE may transmit the request signal to the other user apparatus UE and request the transmission power. Also, the timing of requesting the transmission power of discovery signal is not limited to the timing when the discovery signal is received. The user apparatus UE may arbitrarily transmit a request signal to the base station BS or the other user apparatus UE, receive a response signal, retain the transmission power included in the response signal together with identification information of the user apparatus UE associated with the transmission power in a memory unit such as a memory, and, when the discovery signal is received, read the transmission power from the memory unit and use it for distance estimation.

<Configuration of Base Station BS>

Figure 17:
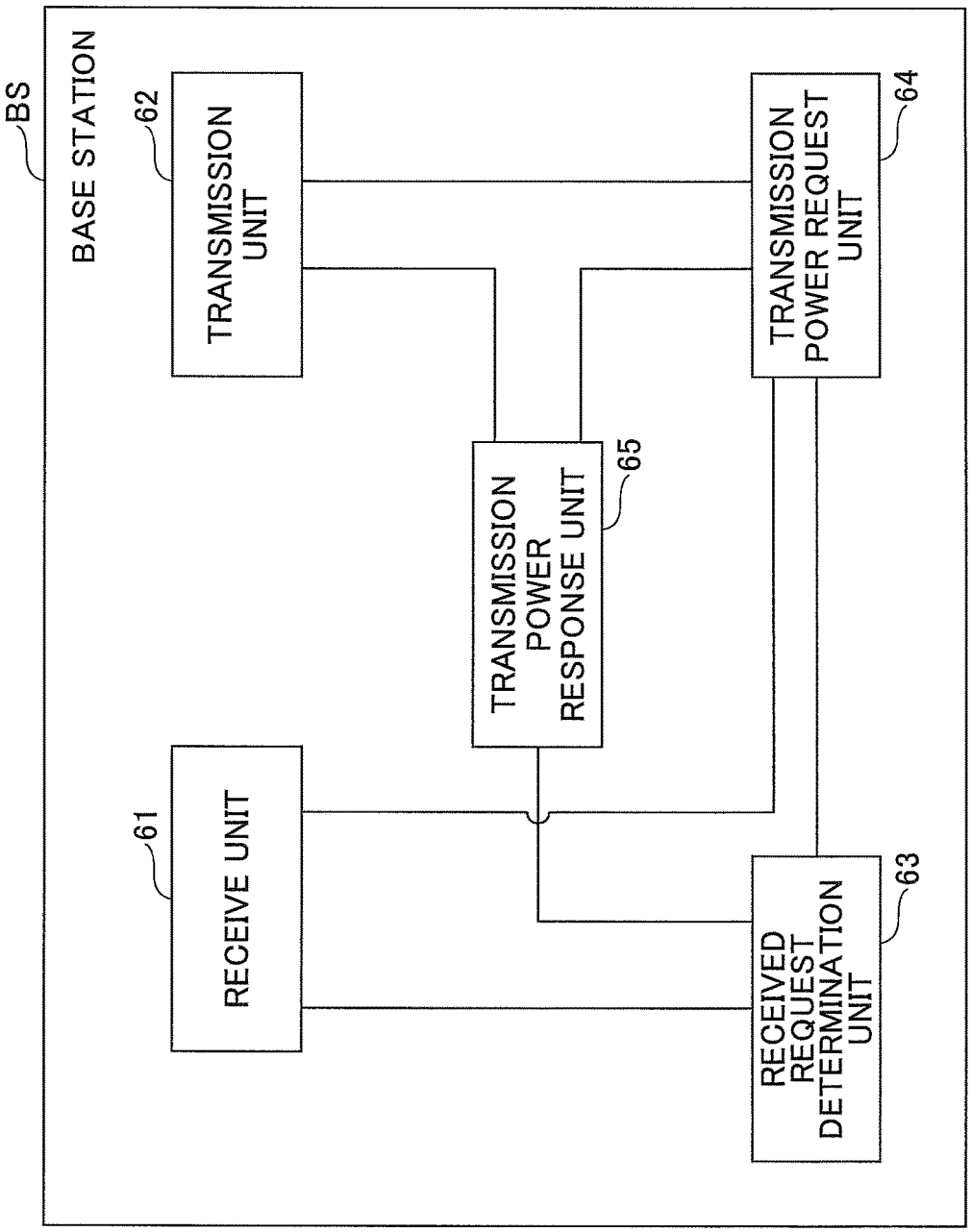
FIG. 17 is a functional configuration diagram of a base station BS in the fourth embodiment.

FIG. 17 shows a functional configuration diagram of the base station BS according to the present embodiment. As shown in FIG. 17, the base station BS according to the present embodiment includes a receive unit 61, a transmission unit 62, a received request determination unit 63, a transmission power requesting unit 64, and a transmission power response unit 65.

The receive unit 61 receives a signal from the user apparatus UE, and the transmission unit 62 transmits a signal to the user apparatus UE. The received request determination unit 63, in the case where a request signal requesting for transmission power of a discovery signal of another user apparatus UE is received from the user apparatus UE, determines whether the transmission power of the discovery signal of the other user apparatus UE is retained in a memory unit such as a memory, and, if it is retained, instructs the transmission power response unit 65 to return a response, and, if it is not retained, instructs the transmission power requesting unit 64 to request the transmission power.

The transmission power response unit 65 transmits a response signal including the transmission power to the user apparatus UE which has requested the transmission power of the discovery signal of the other user apparatus UE via the transmission unit 62. The transmission power requesting unit 64, in the case where a request signal requesting for the transmission power of discovery signal of the other user apparatus UE is received from the user apparatus UE and the transmission power of discovery signal of the other user apparatus UE is not retained, transmits a request signal to the other user apparatus UE, receives a response signal including the transmission power from the other user apparatus UE, transmits the transmission power to the transmission power response unit 65, thereby, instructing the transmission power response unit 65 to transmit a response.

<Operation of Base Station, BS>

Figure 18:
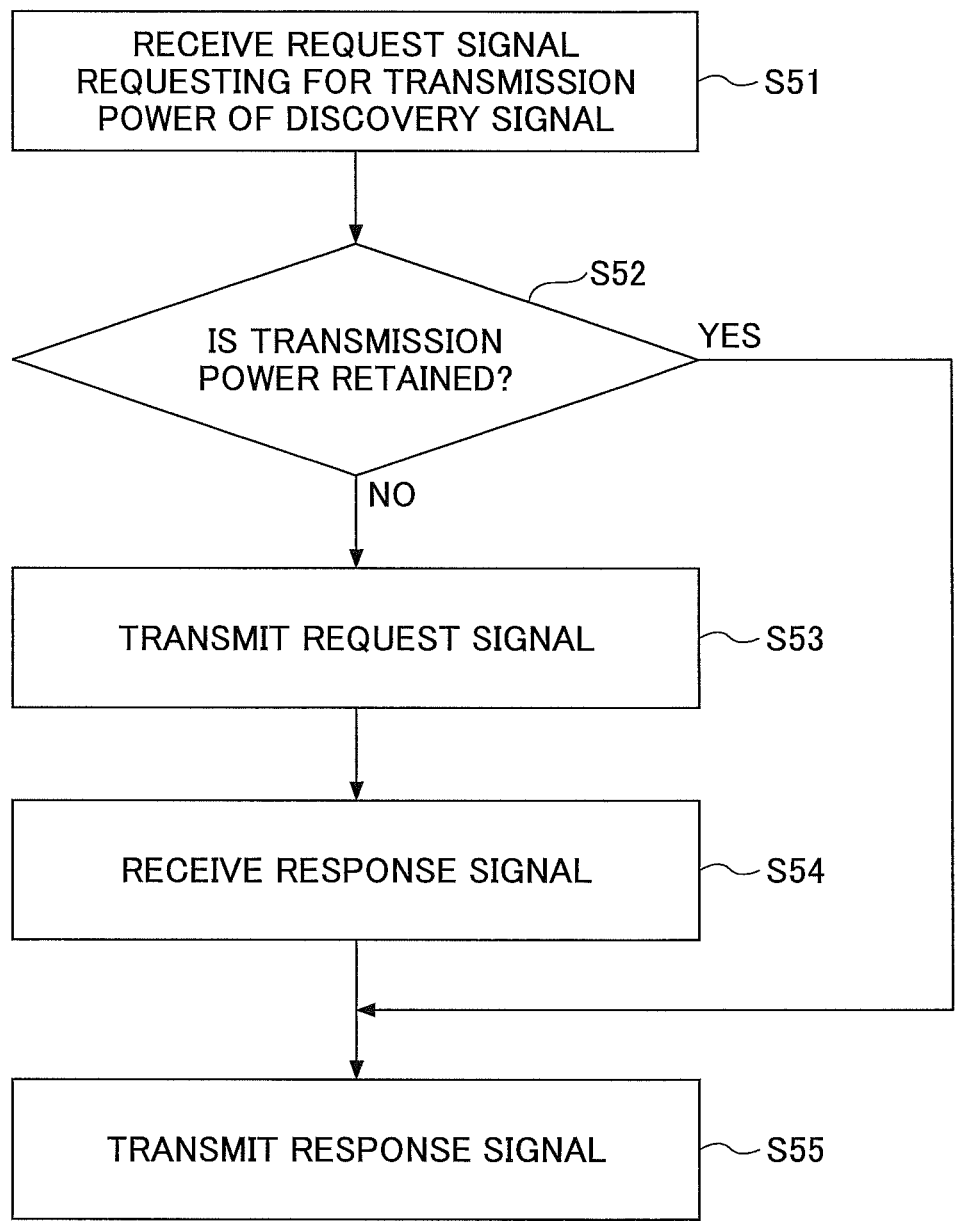
FIG. 18 is a flowchart illustrating operations of the base station BS in the fourth embodiment.

Next, referring to FIG. 18, a process of the base station BS which includes a configuration shown in FIG. 17 will be described.

The receive unit 61 receives a request signal requesting transmission power of discovery signal of the other user apparatus UE (including identification information of the other user apparatus UE) from the user apparatus UE (step 51).

The received request determination unit 63 determines whether the transmission power of the discovery signal of the other user apparatus UE is retained in a memory, or the like, and moves to step 55 if it is retained, and moves to step 53 if it is not retained.

In step 53, the transmission power requesting unit 64 transmits a request signal requesting for transmission power of the discovery signal of the other user apparatus UE to the other user apparatus UE via the transmission unit 62. Then, the transmission power requesting unit 64 receives a response signal including the transmission power from the other user apparatus UE via the receive unit 61 (step 54).

In step 55, the transmission power response unit 65 transmits the response signal including the transmission power of the discovery signal of the other user apparatus UE to the requesting user apparatus UE via the transmission unit 62.

<Configuration of User Apparatus UE>

Figure 19:
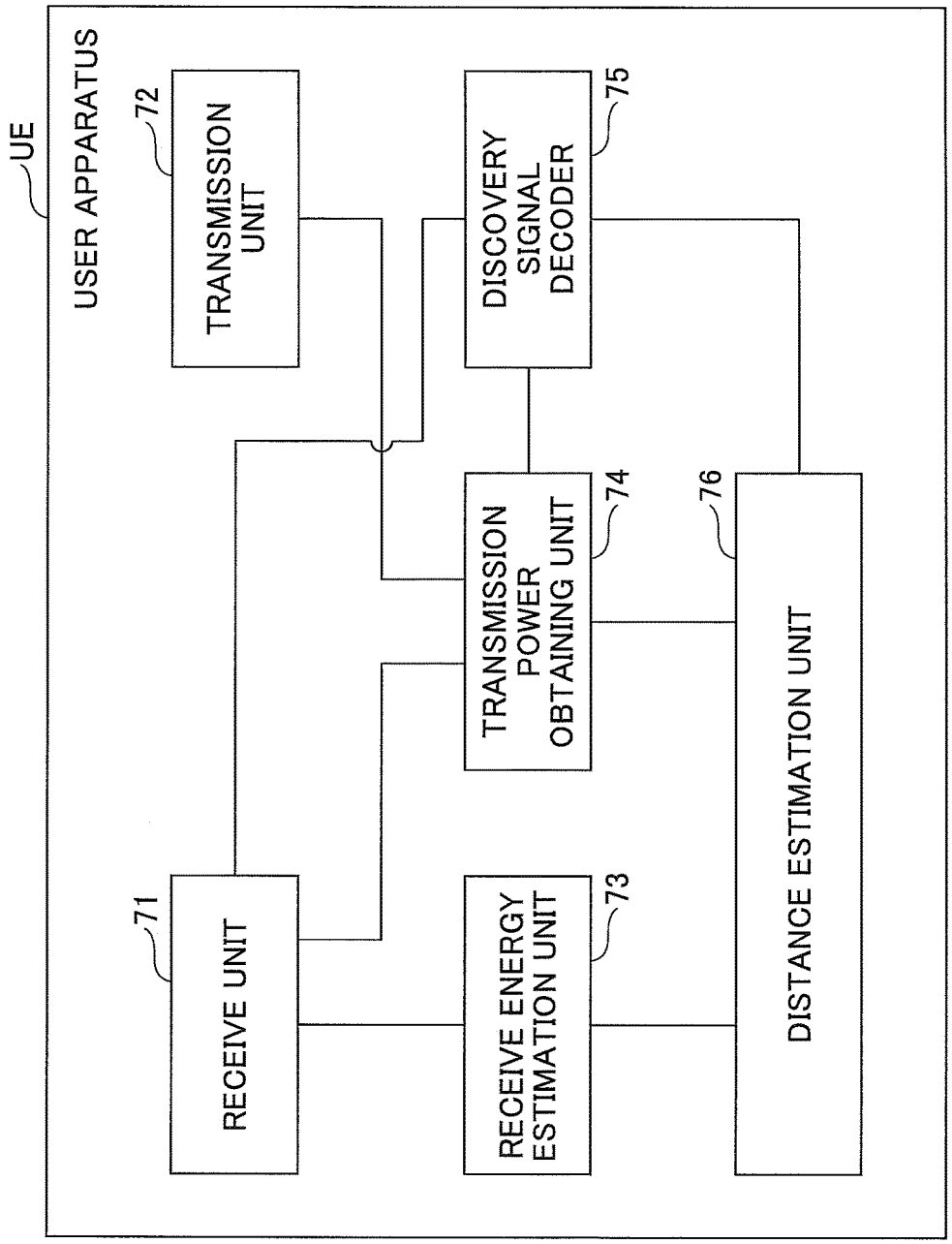
FIG. 19 is a functional configuration diagram of the user apparatus UE in the fourth embodiment.

FIG. 19 shows a functional configuration diagram of the user apparatus UE according to the present embodiment. FIG. 19 especially shows a function for estimating a distance by receiving a discovery signal at the user apparatus UE.

The user apparatus UE includes a receive unit 71, a transmission unit 72, a receive energy estimation unit 73, a transmission power obtaining unit 74, a discovery signal decoder 75, and a distance estimation unit 76.

The receive unit 71 receives a discovery signal in a predetermined radio resource. Also, the receive unit 72 receives a response signal which is a response to a request signal. The transmission unit 72 transmits the request signal.

The receive energy estimation unit 73 measures receive power of the received discovery signal and transmits the value of the receive power to the distance estimation unit 76. It should be noted that the value measured by the receive energy estimation unit 72 is not limited to the receive power and may be receive signal strength, electric field strength at a receive point, or the like. Information related to receive power as shown above which can be used for distance estimation may be referred to as receive power information. The transmission power obtaining unit 74, not only transmits the request signal requesting for transmission power at the user apparatus UE which has transmitted the received discovery signal via the transmission unit 72, but also receives a response signal including the transmission power via the receive unit 71, and transmits the transmission power to the distance estimation unit 76.

The discovery signal decoder 75 extracts identification information of the transmitting user apparatus UE from the received discovery signal and transmits the extracted identification information to the transmission power obtaining unit 74. The distance estimation unit 76 estimates a distance between the user apparatus UE which has transmitted the discovery signal and the user apparatus itself from the receive power and the transmission power.

<Process Flow of User Apparatus UE for Distance Estimation>

Next, referring to the flowchart shown in FIG. 20, a process of the user apparatus UE for estimating, based on the received discovery signal, a distance to the user apparatus UE which has transmitted the discovery signal will be described.

First, the receive unit 71 of the user apparatus UE receives a discovery signal in a radio resource in which the discovery signal is transmitted (step 61).

The receive energy estimation unit 73 measures the receive power in the wireless resource and transmits the measured value to the distance estimation unit 76 (step 62). On the other hand, the discovery signal decoder 75 extracts the identification information of the user apparatus UE from the discovery signal by decoding the discovery signal, and transmits the extracted identification information to the transmission power obtaining unit (step 63).

The transmission power obtaining unit 74 transmits the request signal requesting for transmission power of the discovery signal including identification information of the discovered user apparatus UE via the transmission unit 71, receives a response signal including the transmission power via the receive unit 72, and transmits the transmission power to the distance estimation unit 76 (step 64).

Then, the distance estimation unit 76 estimates a distance between the user apparatus UE discovered by the discovery signal and the user apparatus UE itself based on receive power received from the receive energy estimation unit 73 and the transmission power received from the transmission power obtaining unit 74 (step 65).

Compared with other embodiments, the present embodiment has an advantage in which distance estimation is more accurate and reliable.

CONCLUSION

As described above, according to the embodiment of the present invention, the following user apparatus UE and the base station BS are provided.

In other words, according to the embodiment of the present invention, a user apparatus for, by receiving a discovery signal from another user apparatus, estimating a distance between the other user apparatus and the user apparatus itself is provided, the user apparatus including:

a unit configured to receive from the other user apparatus a discovery signal including transmission power information of the discovery signal;

a unit configured to obtain the transmission power information from the discovery signal; and a unit configured to estimate a distance between the user apparatus and the other user apparatus from receive power information of the discovery signal at the user apparatus and the transmission power information.

Also, according to the embodiment of the present invention, a user apparatus in a mobile communication system including the user apparatus and a base station is provided, the user apparatus, by receiving a discovery signal from another user apparatus, estimating a distance between the other user apparatus and the user apparatus itself, the user apparatus including:

a unit configured to receive from the base station a power class associated with transmission power information of the discovery signal;

a unit configured to receive the discovery signal from the other user apparatus;

a power estimation unit configured to estimate the transmission power information at the other user apparatus of the received discovery signal based on the power class; and a unit configured to estimate a distance between the user apparatus and the other user apparatus from receive power information of the received discovery signal and the transmission power information estimated by the power estimation unit.

Also, according to the embodiment of the present invention, a user apparatus in a mobile communication system including the user apparatus and a base station is provided, the user apparatus, by receiving a discovery signal from another user apparatus, estimating a distance between the other user apparatus and the user apparatus itself, the user apparatus including:

a transmission power obtaining unit configured to receive an uplink signal transmitted from the other user apparatus to the base station and obtain transmission power information of discovery signal at the other user apparatus based on the uplink signal;

a unit configured to receive from the other user apparatus the discovery signal; and a unit configured to estimate a distance between the user apparatus and the other user apparatus from receive power information of the received discovery signal and the transmission power information obtained by the transmission power obtaining unit.

Also, according to the embodiment of the present invention, a user apparatus in a mobile communication system including the user apparatus and a base station is provided, the user apparatus, by receiving a discovery signal from another user apparatus, estimating a distance between the other user apparatus and the user apparatus itself, the user apparatus including:

a transmission power obtaining unit configured to transmit to the base station a request signal requesting for transmission power information of discovery signal at the other user apparatus, and receive from the base station a response signal including the transmission power information; and a unit configured to estimate a distance between the user apparatus and the other user apparatus from receive power information of the discovery signal received from the other user apparatus and the transmission power information obtained by the transmission power obtaining unit.

Also, according to the embodiment of the present invention, a base station which controls transmission power of discovery signal at a user apparatus is provided, the base station including:

a user apparatus number estimation unit configured to estimate a number of user apparatuses transmitting discovery signals by monitoring the discovery signals transmitted from the user apparatuses;

a power class determination unit configure to, by referring to power class setting information which associates a number of user apparatuses transmitting discover signals with a power class used for determining transmission power information of the discovery signal at the user apparatus, determine the power class associated with the number of user apparatuses estimated by the user apparatus number estimation unit; and a unit configured to transmit the power class determined by the power class determination unit to the user apparatuses.

As described above, embodiments of the present invention have been described. The disclosed invention is not limited to these embodiments, and a person skilled in the art would understand various variations, modifications, replacements, or the like. Specific examples of numerical values have been used for encouraging understanding of the present invention. These numeric values are merely examples and, unless otherwise noted, any appropriate values may be used. In the above description, partitioning of items is not essential to the present invention. Matters described in more than two items may be combined if necessary. Matters described in one item may be applied to matters described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. For convenience of description, the user apparatus UE and the base station BS have been described using functional block diagrams. These apparatuses may be implemented by hardware, by software, or by combination of both. The software which operates according to the present invention (software which is executed by a processor included in a user apparatus UE, and software which is executed by a processor included in a base station BS) may be stored in a random access memory (RAM), a flash memory, a read-only memory (ROM), an EPROM, an EEPROM, a register, a hard disk drive (HDD), a removable disk, a CD-ROM, a database, a server, or any other appropriate memory medium. The present invention is not limited to the above embodiments and various variations, modifications, alternatives, replacements, etc., may be included in the present invention without departing from the spirit of the invention.

The present PCT application is based on and claims the benefit of priority of Japanese Priority Application No. 2013-023393 filed on Feb. 8, 2013, the entire contents of which are hereby incorporated by reference.

DESCRIPTION OF THE REFERENCE NUMERALS

UE User apparatus
BS Base station
11, 32, 62, 72 Transmission unit
12 Discovery signal generation unit
13 Indicator determination unit
21, 31, 41, 51, 61, 71 Receive unit
22, 42, 52, 73 Receive energy estimation unit
23, 45, 54, 75 Discovery signal decoder
24, 46, 55, 76 Distance estimation unit
33 User apparatus number estimation unit
34 Class determination unit
35 Power class setting information storing unit
43 Class obtaining/retaining unit
44, 53 Transmission power estimation unit
63 Received request determination unit
64 Transmission power request unit
65 Transmission power response unit
74 Transmission power obtaining unit

The invention claimed is:

1. A distance estimation method for, by causing a first user apparatus to receive a discovery signal from a second user apparatus, estimating a distance between the first user apparatus and the second user apparatus, the distance estimation method comprising:
a step of receiving from the second user apparatus the discovery signal including transmission power information of the discovery signal;
a step of obtaining the transmission power information from the discovery signal; and
a step of estimating the distance between the first user apparatus and the second user apparatus from receive power information of the discovery signal at the first user apparatus and the transmission power information,
wherein the transmission power information is a set of transmission power and transmission antenna gain.

2. A distance estimation method in a mobile communication system including a user apparatus and a base station for, by causing a first user apparatus to receive a discovery signal from a second user apparatus, estimating a distance between the first user apparatus and the second user apparatus, the distance estimation method comprising:
a step of receiving from the base station a power class corresponding to transmission power information of the discovery signal;
a step of receiving the discovery signal from the second user apparatus;
a power estimation step of estimating the transmission power information of the discovery signal received at the second user apparatus based on the power class; and
a step of estimating the distance between the first user apparatus and the second user apparatus based on receive power information of the discovery signal received at the first user apparatus and the transmission power information estimated in the power estimation step,
wherein the transmission power information is a set of transmission power and transmission antenna gain.

3. The distance estimation method according to claim 2, wherein the step of estimating includes estimating, by the first user apparatus, the transmission power information of the received discovery signal at the second user apparatus, based on the power class and a service type determined from identification information extracted from the discovery signal.

4. A distance estimation method in a mobile communication system including a user apparatus and a base station for, by causing a first user apparatus to receive a discovery signal from a second user apparatus, estimating a distance between the first user apparatus and the second user apparatus, the distance estimation method comprising:
a transmission power obtaining step of receiving an uplink signal transmitted from the second user apparatus to the base station and obtaining transmission power information of the discovery signal at the second user apparatus based on the uplink signal;
a step of receiving the discovery signal from the second user apparatus; and
a step of estimating the distance between the first user apparatus and the second user apparatus based on receive power information of the discovery signal received at the first user apparatus and the transmission power information obtained in the transmission power obtaining step,
wherein the transmission power information is a set of transmission power and transmission antenna gain.

5. A distance estimation method in a mobile communication system including a user apparatus and a base station for, by causing a first user apparatus to receive a discovery signal from a second user apparatus, estimating a distance between the first user apparatus and the second user apparatus, the distance estimation method comprising:
a transmission power obtaining step of transmitting a request signal requesting for transmission power information of the discovery signal of the second user apparatus to the base station and receiving a response signal including the transmission power information from the base station; and
a step of estimating the distance between the first user apparatus and the second user apparatus from receive power information of the discovery signal received from the second user apparatus and the transmission power information obtained in the transmission power obtaining step,
wherein the transmission power information is a set of transmission power and transmission antenna gain.

6. A user apparatus for, by receiving a discovery signal from another user apparatus, estimating a distance between the user apparatus and the other user apparatus, the user apparatus comprising:
- a receiver configured to receive from the other user apparatus a discovery signal including transmission power information of the discovery signal; and
- a processor configured to:
  - obtain the transmission power information from the discovery signal; and
  - estimate the distance between the user apparatus and the other user apparatus from receive power information of the discovery signal at the user apparatus and the transmission power information,
- wherein the transmission power information is a set of transmission power and transmission antenna gain.

7. A user apparatus in a mobile communication system including the user apparatus and a base station, for, by receiving a discovery signal from another user apparatus, estimating a distance between the other user apparatus and the user apparatus, the user apparatus comprising:
- a receiver configured to:
  - receive from the base station a power class associated with transmission power information of the discovery signal; and
  - receive the discovery signal from the other user apparatus, and
- a processor configured to:
  - estimate the transmission power information of the received discovery signal at the other user apparatus based on the power class; and
  - estimate the distance between the user apparatus and the other user apparatus from receive power information of the received discovery signal and the estimated transmission power information,
- wherein the transmission power information is a set of transmission power and transmission antenna gain.

8. The user apparatus according to claim 7, wherein the processor estimates the transmission power information of the received discovery signal at the other user apparatus based on the power class and a service type determined from identification information extracted from the discovery signal.

9. A user apparatus in a mobile communication system including the user apparatus and a base station, for, by receiving a discovery signal from another user apparatus, estimating a distance between the other user apparatus and the user apparatus, the user apparatus comprising:
- a receiver configured to:
  - receive an uplink signal transmitted from the other user apparatus to the base station; and
  - receive the discovery signal from the other user apparatus; and
- a processor configured to:
  - obtain transmission power information of the discovery signal at the other user apparatus based on the uplink signal; and
  - estimate the distance between the user apparatus and the other user apparatus from receive power information of the received discovery signal and the obtained transmission power information,
- wherein the transmission power information is a set of transmission power and transmission antenna gain.

10. A user apparatus in a mobile communication system including the user apparatus and a base station, for, by receiving a discovery signal from another user apparatus, estimating a distance between the other user apparatus and the user apparatus, the user apparatus comprising:
- a transmitter configured to transmit to the base station a request signal requesting for transmission power information of the discovery signal at the other user apparatus;
- a receiver configured to receive from the base station a response signal including the transmission power information; and
- a processor configured to estimate the distance between the user apparatus and the other user apparatus from receive power information of the discovery signal received from the other user apparatus and the obtained transmission power information,
- wherein the transmission power information is a set of transmission power and transmission antenna gain.

* * * * *